(12) United States Patent
Lin et al.

(10) Patent No.: US 9,607,397 B2
(45) Date of Patent: Mar. 28, 2017

(54) METHODS AND SYSTEMS FOR GENERATING A USER-HAIR-COLOR MODEL

(71) Applicant: Personify, Inc., Chicago, IL (US)

(72) Inventors: Dennis Lin, Chicago, IL (US); Glenn Francisco, Chicago, IL (US); Yi Zhang, Chicago, IL (US); Gia Dang, Ho Chi Minh (VN); Simion Venshtain, Chicago, IL (US); Quang Nguyen, Ho Chi Minh (VN); Long Dang, Ho Chi Minh (VN)

(73) Assignee: PERSONIFY, INC., Chicago, IL (US)

( * ) Notice: Subject to any disclaimer, the term of this patent is extended or adjusted under 35 U.S.C. 154(b) by 0 days.

(21) Appl. No.: 14/842,525

(22) Filed: Sep. 1, 2015

(65) Prior Publication Data
US 2017/0061640 A1   Mar. 2, 2017

(51) Int. Cl.
*G06K 9/00*   (2006.01)
*G06T 7/00*   (2017.01)
(Continued)

(52) U.S. Cl.
CPC .......... *G06T 7/0083* (2013.01); *G06K 9/4652* (2013.01); *G06T 7/0051* (2013.01); *H04N 5/225* (2013.01); *G06T 2207/10024* (2013.01)

(58) Field of Classification Search
CPC ............ G06K 7/0095; G06K 9/00228; G06K 9/00234; G06K 9/00268; G06K 9/00581; G06K 9/00288; G06K 9/34; G06K 9/6207; G06K 9/6267; G06K 9/6289; G06K 9/00221; G06K 9/46; G06K 9/4604; G06K 9/4633; G06K 9/6204; G06K 9/6206;
(Continued)

(56) References Cited

U.S. PATENT DOCUMENTS 5,001,558 A   3/1991   Burley et al.
5,022,085 A   6/1991   Cok
(Continued)

OTHER PUBLICATIONS

Wang, L., et al., "Tofcut: Towards robust real-time foreground extraction using a time-of-flight camera." Proc. of BDPVT 2010. (The year of publication in sufficiently earlier than the effective U.S. filig date and any foreign priority date so that the particular month of publication is not an issue.).
(Continued)

*Primary Examiner* — Jose Couso
(74) *Attorney, Agent, or Firm* — Invention Mine LLC

(57) ABSTRACT

Disclosed herein are methods and systems for generating a user-hair-color model. One embodiment takes the form of a process that includes obtaining video data depicting a head of a user. The process also includes determining a set of line segments of pixels of the video data, wherein each line segment in the determined set of line segments intersects an upper contour of the depicted head of the user. The process also includes grouping at least some of the pixels of at least one of the line segments in the determined set of line segments into three sets of pixels based at least in part on respective color data of the pixels. The three sets of pixels include a skin-pixel set, a hair-pixel set, and a background-pixel set. The process also includes updating a user hair-color model based at least in part on the skin-pixel set.

20 Claims, 21 Drawing Sheets

(51) Int. Cl.
*G06K 9/46* (2006.01)
*H04N 5/225* (2006.01)

(58) Field of Classification Search
CPC ............... G06K 9/6211; G06K 9/6269; G06K
15/1834; G06K 15/1838; G06K
2215/0034; G06T 7/0081; G06T 11/00;
G06T 11/001; G06T 17/00; G06T 19/00;
G06T 2200/24; G06T 2207/10016; G06T
2207/10024; G06T 2207/20144; G06T
2207/30196; G06T 2207/30201; G06T
7/0079; G06T 7/0083; G06T 7/0085;
G06T 11/20; G06T 11/203; G06T 7/00;
G06T 2207/20136–2207/2044; G06T
2215/06; H04N 7/147; H04N 7/15; H04L
63/02; H04L 63/08; H04L 63/0861; H04L
63/1416; H04L 63/20; H04L 65/403;
H04L 67/306; A63F 13/10; A63F 13/12;
A63F 13/55; A63F 13/56; A63F 13/79;
A63F 2300/5553; H04W 4/22; H04W
12/06; H04W 12/08; A45D 44/005; A45D
2019/0066; A45D 2044/007; G06Q 30/02;
G06Q 30/0269; G06Q 30/0601; G06F
3/04815; G06F 3/04817; G06F 17/5009;
G06F 21/31; G07C 9/00031
See application file for complete search history.

(56) References Cited

U.S. PATENT DOCUMENTS

| | | | |
|---|---|---|---|
| 5,117,283 A | 5/1992 | Kroos et al. | |
| 5,227,985 A | 7/1993 | DeMenthon | |
| 5,343,311 A | 8/1994 | Morag et al. | |
| 5,506,946 A | 4/1996 | Bar et al. | |
| 5,517,334 A | 5/1996 | Morag et al. | |
| 5,534,917 A | 7/1996 | MacDougall | |
| 5,581,276 A | 12/1996 | Cipolla et al. | |
| 5,631,697 A | 5/1997 | Nishimura et al. | |
| 5,687,306 A | 11/1997 | Blank | |
| 6,150,930 A | 11/2000 | Cooper | |
| 6,411,744 B1 | 6/2002 | Edwards | |
| 6,661,918 B1 | 12/2003 | Gordon et al. | |
| 6,664,973 B1 | 12/2003 | Iwamoto et al. | |
| 7,317,830 B1 | 1/2008 | Gordon et al. | |
| 7,574,043 B2 | 8/2009 | Porikil | |
| 7,633,511 B2 | 12/2009 | Shum et al. | |
| 7,773,136 B2 | 8/2010 | Ohyama et al. | |
| 8,175,384 B1 | 5/2012 | Wang | |
| 8,300,890 B1 | 10/2012 | Gaikwad et al. | |
| 8,320,666 B2 | 11/2012 | Gong | |
| 8,396,328 B2 | 3/2013 | Sandrew et al. | |
| 8,649,932 B2 | 2/2014 | Mian et al. | |
| 8,884,980 B2 * | 11/2014 | Mallick ................ | G06T 11/001 345/593 |
| 2002/0051491 A1 | 5/2002 | Challapali et al. | |
| 2002/0158873 A1 | 10/2002 | Williamson | |
| 2004/0153671 A1 | 8/2004 | Schuyler et al. | |
| 2005/0094879 A1 | 5/2005 | Harville | |
| 2005/0219264 A1 | 10/2005 | Shum et al. | |
| 2006/0072022 A1 | 4/2006 | Iwai | |
| 2006/0193509 A1 | 8/2006 | Criminisi et al. | |
| 2007/0036432 A1 | 2/2007 | Xu et al. | |
| 2007/0110298 A1 | 5/2007 | Graepel et al. | |
| 2007/0146512 A1 | 6/2007 | Suzuki et al. | |
| 2007/0201738 A1 | 8/2007 | Toda et al. | |
| 2008/0181507 A1 | 7/2008 | Gope et al. | |
| 2008/0273751 A1 | 11/2008 | Yuan et al. | |
| 2009/0003687 A1 | 1/2009 | Agarwal et al. | |
| 2009/0110299 A1 | 4/2009 | Tehrani et al. | |
| 2009/0244309 A1 | 10/2009 | Maison | |
| 2009/0245571 A1 | 10/2009 | Chien et al. | |
| 2009/0284627 A1 | 11/2009 | Bando et al. | |
| 2010/0046830 A1 | 2/2010 | Wang et al. | |
| 2010/0053212 A1 | 3/2010 | Kang et al. | |
| 2010/0128927 A1 | 5/2010 | Ikenoue | |
| 2010/0195898 A1 | 8/2010 | Bang et al. | |
| 2010/0302395 A1 | 12/2010 | Mathe et al. | |
| 2011/0038536 A1 | 2/2011 | Gong | |
| 2011/0115886 A1 | 5/2011 | Nguyen et al. | |
| 2011/0193939 A1 | 8/2011 | Vassigh | |
| 2011/0243430 A1 | 10/2011 | Hung et al. | |
| 2011/0249883 A1 | 10/2011 | Can et al. | |
| 2011/0293179 A1 | 12/2011 | Dikmen | |
| 2012/0051631 A1 | 3/2012 | Nguyen et al. | |
| 2013/0016097 A1 | 1/2013 | Coene et al. | |
| 2013/0028476 A1 | 1/2013 | Craig et al. | |
| 2013/0094780 A1 | 4/2013 | Tang et al. | |
| 2013/0142452 A1 | 6/2013 | Shionozaki et al. | |
| 2013/0243313 A1 | 9/2013 | Civit et al. | |
| 2014/0029788 A1 | 1/2014 | Kang | |
| 2014/0153784 A1 | 6/2014 | Gandolph et al. | |
| 2014/0307056 A1 | 10/2014 | Romea et al. | |
| 2015/0187076 A1 * | 7/2015 | Lin .......................... | H04N 7/15 382/103 |

OTHER PUBLICATIONS

Xu, F. et al., "Human detection using depth and gray images", Advanced Video and Signal Based Surveillance, 2003, Proceedings IEEE Conference. (The year of publication is sufficiently earlier that the effective U.S. filing date and any foreign priority date so that the particular month of publication is not an issue.).

Zhang, Q., et al., "Segmentation and tracking multiple objects under occlusion from multiview video", Image Processing, IEEE Transactions on 20.11 (2011): 3308-3313. (The year of publication is sufficiently earlier than the affective U.S. filing date and any foreign priority date so that the particular month of publication is not an issue.).

Rother, C., et al., "Grabut: Interactive Foreground extraction using iterated graph cuts", ACM Transactions on Graphics (TOG)23.3 (2004): 309-314. (The year of publication is sufficiently earlier than the effective U.S. filing date and any foreign priority date so that the particular month of publication is not an issue.).

Arbelaez, P., et al., "Contour detection and hierarchical image segmentation", Pattern Analysis and Machine Intelligence, IEEE Transactions on 33.5 (2011): 898-916. (The year of publication is sufficiently earlier than the affective U.S. filing date and any foreign priority date so that the particular month of publication is not an issue.).

Izquierdo, M. Ebroul, "Disparity/segmentation analysis: matching with an adaptive window and depth-driven segmentation", Circuits and Systems for Video Technology, IEEE Transactions on 9.4 (1999): 589-607. (The year of publication is sufficiently earlier than the effective U.S. filing date and any foreign priority date so that the particular month of publication is not an issue.).

Lee, D.S., "Effective Gaussian Mixture Learning for Video Background Subtraction", IEEE, May 2005. (The year of 3ublic.ation is sufficiently earlier than the effective U.S. filing date and any foreign priority date so that the particular month of publication is not an issue.).

Benezeth et al., "Review and Evaluation of Commonly-Implemented Background Subtraction Algorithms", 2008. (The year of publication is sufficiently earlier than the effective U.S. filing date and any foreign priority date so that the particular month of publication is not an issue.).

Piccardi, M., "Background Subtraction Techniques: A Review", IEEE, 2004. (The year of publication is sufficiently earlier than the effective U.S. filing date and any foreign priority date so that the particular month of publication is not an issue.).

Cheung et al., "Robust Techniques for Background Subtraction in Urban Traffic Video", 2004. (The year of publication is sufficiently earlier than the effective U.S. filing date and any foreign priority date so that the particular month of publication is not an issue.).

Kolmogorov et al., "Bi-Layer Segmentation of Binocular Stereo Vision", IEEE, 2005. (the year of publication is sufficiently earlier

(56) References Cited

OTHER PUBLICATIONS than the effective U.S. filing date and any foreign priority date so that the particular month of publication is not an issue.).
Gvili et al., "Depth Keying", 2003. (The year of publication is sufficiently earlier than the effective U.S. filing date and any foreign priority date so that the particular month of publication is not an issue.).
Crabb et al., "Real-Time Foreground Segmentation via Range and Color Imaging", 2008. (The year of publication is sufficiently earlier than the effective U.S. filing date and any foreign priority date so that the particular maonth of publication is not an issue.).

* cited by examiner

METHODS AND SYSTEMS FOR GENERATING A USER-HAIR-COLOR MODEL

BACKGROUND

Online data communications are quite prevalent and pervasive in modern society, and are becoming more so all the time. Moreover, developments in software, communication protocols, and peripheral devices (e.g., video cameras, three-dimension video cameras, and the like), along with developments in other computing disciplines, have collectively enabled and facilitated the inclusion of multimedia experiences as part of such communications. Indeed, the multimedia nature and aspects of a given communication session are often the focus and even essence of such communications. These multimedia experiences take forms such as audio chats, video chats (that are usually also audio chats), online meetings (e.g., web meetings), and of course many other examples could be listed as well.

Using the context of online meetings as an illustrative example, it is often the case that one of the participants in the video conference call is a designated presenter, and often this user opts to embed a digital representation of themselves (i.e., a persona) as part of the offered presentation. By way of example, the user may choose to have a video feed embedded into a power point presentation. In a simple scenario, the video feed may include a depiction of the user as well as background information. The background information may include a view of the wall behind the user as seen from the point of view of the video camera. If the user is outside, the background information may include buildings and trees. In more advanced versions of this video conferencing paradigm, the persona is isolated from the background information found in video feed. This allows viewers to experience a more natural sensation as the embedded persona they see within the presentation is not cluttered and surrounded by distracting and undesired background information.

OVERVIEW

Improvements over the above-described developments have recently been realized by technology that, among other capabilities and features, extracts what is known as a "persona" of a user from a video feed from a video camera that is capturing video of the user. The extracted persona, which in some examples appears as a depiction of part of the user (i.e., upper torso, shoulders, arms, hands, neck, and head) and in other examples appears as a depiction of the entire user. This technology is described in the following patent documents, each of which is incorporated in its respective entirety into this disclosure: (i) U.S. patent application Ser. No. 13/083,470, entitled "Systems and Methods for Accurate User Foreground Video Extraction," filed Apr. 8, 2011 and published Oct. 13, 2011 as U.S. Patent Application Pub. No. US2011/0249190, (ii) U.S. patent application Ser. No. 13/076,264, entitled "Systems and Methods for Embedding a Foreground Video into a Background Feed based on a Control Input," filed Mar. 30, 2011 and published Oct. 6, 2011 as U.S. Patent Application Pub. No. US2011/0242277, and (iii) U.S. application Ser. No. 14/145,874, entitled "System and Methods for Persona Identification Using Combined Probability Maps," filed Dec. 31, 2013 and published Jul. 2, 2015 as U.S. Publication No. US2015-0187076.

Facilitating accurate and precise extraction of the persona, especially the hair of the persona, from a video feed is not a trivial matter. As mentioned, persona extraction is carried out with respect to video data that is received from a camera that is capturing video of a scene in which the user is positioned. The persona-extraction technology substantially continuously (e.g., with respect to each frame) identifies which pixels represent the user and which pixels do not, and accordingly generates "alpha masks" (e.g., generates an alpha mask for each frame), where a given alpha mask may take the form of or at least include an array with a respective stored data element corresponding to each pixel in the corresponding frame, where such stored data elements are individually and respectively set equal to 1 (one) for each user pixel and to 0 (zero) for every other pixel (i.e., for each non-user (a.k.a. background) pixel).

The described alpha masks correspond in name with the definition of the "A" in the "RGBA" pixel-data format known to those of skill in the art, where "R" is a red-color value, "G" is a green-color value, "B" is a blue-color value, and "A" is an alpha value ranging from 0 (complete transparency) to 1 (complete opacity). In a typical implementation, the "0" in the previous sentence may take the form of a hexadecimal number such as 0x00 (equal to a decimal value of 0 (zero)), while the "1" may take the form of a hexadecimal number such as 0xFF (equal to a decimal value of 255); that is, a given alpha value may be expressed as an 8-bit number that can be set equal to any integer that is (i) greater than or equal to zero and (ii) less than or equal to 255. Moreover, a typical RGBA implementation provides for such an 8-bit alpha number for each of what are known as the red channel, the green channel, and the blue channel; as such, each pixel has (i) a red ("R") color value whose corresponding transparency value can be set to any integer value between 0x00 and 0xFF, (ii) a green ("G") color value whose corresponding transparency value can be set to any integer value between 0x00 and 0xFF, and (iii) a blue ("B") color value whose corresponding transparency value can be set to any integer value between 0x00 and 0xFF. And certainly other pixel-data formats could be used, as deemed suitable by those having skill in the relevant art for a given implementation.

When merging an extracted persona with content, the above-referenced persona-based technology creates the above-mentioned merged display in a manner consistent with these conventions; in particular, on a pixel-by-pixel (i.e., pixel-wise) basis, the merging is carried out using pixels from the captured video frame for which the corresponding alpha-mask values equal 1, and otherwise using pixels from the content. Moreover, it is noted that pixel data structures typically also include or are otherwise associated with one or more other values corresponding respectively to one or more other properties of the pixel, where brightness is an example of one such property. In some embodiments, the brightness value is the luma component of the image or video frame. In other embodiments, the brightness value is the pixel values of one of an R, G, or B color channel, or other similar color space (e.g., gamma compressed RGB, or R'G'B', or YUV, or YCbCr, as examples). In other embodiments, the brightness value may be a weighted average of pixel values from one or more color channels. And other approaches exist as well.

This disclosure describes systems and methods for generating a user-hair-color model. Such systems and methods are useful for scenarios in which a user's persona is to be extracted from a video feed, for example, in an online "panel discussion" or more generally an online meeting or other online communication session. The present systems and methods facilitate natural interaction by enabling the accurate and precise identification of the user's hair color, which in turn may be used to identify and extract the hair of the user, a particularly troublesome aspect of a comprehensive user extraction process. The present systems and methods therefore provide an advanced approach for generating a user-hair-color model which may in turn be used for hair detection in the context of a persona extraction process. A hair detection process involves a multi-step approach, at least one of which includes identifying or generating an accurate representation of colors found in a user's depicted hair.

One embodiment of the systems and methods disclosed herein takes the form of a process. The process includes obtaining video data depicting a head of a user. The process also includes determining a set of line segments of pixels of the video data. Each line segment in the determined set of line segments intersects an upper contour of the depicted head of the user. The process also includes grouping at least some of the pixels of at least one of the line segments in the determined set of line segments into three sets of pixels based at least in part on respective color data of the pixels. The three sets of pixels include a skin-pixel set, a hair-pixel set, and a background-pixel set. The process also includes updating a user hair-color model based at least in part on the hair-pixel set.

Another embodiment takes the form of a system that includes a communication interface, a processor, and data storage containing instructions executable by the processor for causing the system to carry out at least the functions described in the preceding paragraph.

One embodiment of the systems and methods disclosed herein takes the form of a process. The process includes obtaining video data depicting a head of a user. The process also includes determining a set of line segments of pixels of the video data. Each line segment in the determined set of line segments intersects an upper contour of the depicted head of the user. The process also includes performing multiple independent groupings of at least some of the pixels of at least one of the line segments in the determined set of line segments. Each performed grouping respectively outputs three sets of pixels based at least in part on respective color data of the pixels. Each respective three sets of pixels includes a respective skin-pixel set, a respective hair-pixel set, and a respective background-pixel set. The process also includes selecting one of the respective hair-pixel sets based on one or more hair-pixel-set quality metrics. The process also includes updating a user hair-color model based at least in part on the selected hair-pixel set.

Another embodiment takes the form of a system that includes a communication interface, a processor, and data storage containing instructions executable by the processor for causing the system to carry out at least the functions described in the preceding paragraph.

One embodiment of the systems and methods disclosed herein takes the form of a process. The process includes obtaining video data depicting a head of a user, obtaining an upper contour of the head of the user, and determining a set of line segments of pixel data, each line segment in the set crossing the upper contour. The process also includes selecting a first number of k-means initial configurations. Each selected k-means initial configuration includes, for each line segment in the set of line segments, two initial mean colors that are configuration-independent and one initial mean color that is configuration-dependent. The process also includes performing the first number of independent k-means analyses on the set of line segments. Each independent k-means analysis uses a different one of the selected k-means initial configurations and each independent k-means analysis identifies, for each line segment in the set of line segments, three final mean colors respectively derived from the three initial mean colors. The process also includes, for each of the performed k-means analyses, using the final mean colors derived from the configuration-dependent initial mean colors to identify a respective set of hair-color pixels from the pixels in the line segments. The process also includes selecting one of the identified sets of hair-color pixels based on one or more hair-color-pixel-set criteria. The process also includes using the selected set of hair-color pixels to generate a user-hair-color model.

Another embodiment takes the form of a system that includes a communication interface, a processor, and data storage containing instructions executable by the processor for causing the system to carry out at least the functions described in the preceding paragraph.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, obtaining the video data includes obtaining the video data using a video camera. The video camera may be a three-dimension (3-D) video camera that captures the video data as well as depth data associated with the video data. In such an embodiment, obtaining depth data associated with the video data includes obtaining the depth data via the 3-D video camera. In another embodiment, obtaining the video data includes obtaining the video data via a data store.

In at least one embodiment, the process further includes generating the upper contour of the depicted head of the user. In at least one such embodiment, generating the upper contour of the depicted head of the user includes (i) obtaining depth data that is associated with the video data, (ii) identifying a region of the video data that corresponds with depth values that are within a threshold depth range, and (iii) identifying an upper boundary of the identified region as being the upper contour of the depicted head of the user. In at least one other such embodiment, generating the upper contour of the depicted head of the user includes (i) obtaining a head contour that estimates an outline of the depicted head of the user, and (ii) identifying an upper boundary of the obtained head contour as being the upper contour of the depicted head of the user.

In at least one embodiment, obtaining the upper contour of the head of the user comprises generating the upper contour of the head of the user based at least in part on depth data associated with the video data. The depth data associated with the video data may be obtained with the video data via a 3-D video camera or may be obtained via an independent depth sensor.

In at least one embodiment, wherein generating the upper contour of the head of the user based at least in part on depth data associated with the video data, generating the upper contour of the head of the user based at least in part on a threshold depth value.

In at least one embodiment, obtaining the upper contour of the head of the user comprises (i) obtaining a head contour that estimates an outline of the head of the user, and (ii) identifying an upper portion of the obtained head contour as being the upper contour of the head of the user. The head contour may be obtained at least in part using depth data associated with the video data.

In at least one embodiment, determining the set of line segments of pixels of the video data includes (i) identifying a center of the depicted head of the user, (ii) identifying at least one line segment of pixels of the video data that originates from the identified center of the depicted head of the user and intersects the upper contour, and (iii) determining the identified at least one line segment of pixels of the video data to be in the set of line segments.

In at least one embodiment, determining the set of line segments of pixels includes three steps. A first step includes identifying a center of the head of the user. A second step includes selecting a plurality of line segments originating from the identified center of the head of the user and crossing the upper contour. A third step includes determining the set of line segments of pixels to be the selected plurality.

In at least one embodiment, each line segment in the determined set of line segments crosses the upper contour and extends into a background portion of the video data. The background portion may be determined using the depth data associated with the video data. In at least one embodiment, each of the line segments in the determined set of line segments is perpendicular to the upper contour.

In at least one embodiment, the grouping assigns each of the pixels to one and only one of the three sets of pixels. In at least one embodiment, the grouping assigns at least one of the pixels to more than one of the three sets of pixels. In at least one such embodiment, each of the pixels that are assigned to more than one of the three sets of pixels is associated with respective set-assignment likelihoods.

In at least one embodiment, grouping the pixels includes performing multiple independent groupings of at least some of the pixels of at least one of the line segments in the selected set of line segments. Each performed grouping respectively outputs three sets of pixels based at least in part on respective color data of the pixels. Each respective three sets of pixels includes a respective skin-pixel set, a respective hair-pixel set, and a respective background-pixel set. In at least one such embodiment the method further includes selecting one of the respective hair-pixel sets based on one or more hair-pixel-set quality metrics. In such embodiments, updating the user hair-color model based at least in part on the hair-pixel set includes updating the user hair-color model based at least in part on the selected hair-pixel set.

In at least one embodiment, each independent grouping of at least some of the pixels of at least one of the line segments in the determined set of line segments employs a different type of grouping algorithm. In at least one embodiment, each independent grouping of at least some of the pixels of at least one of the line segments in the determined set of line segments employs a same type of grouping algorithm and a different set of grouping algorithm parameters. Grouping algorithm parameters may be referred to as initial configurations or initial conditions.

In at least one embodiment, the process further includes updating a background-color model based at least in part on the background-pixel set.

In at least one embodiment, the user hair-color model is at least one of a histogram, a machine learning classifier, a Gaussian mixture, and an array of color values with respective color counts.

In at least one embodiment, updating the user hair-color model based at least in part on the hair-pixel set includes, for each pixel in the hair-pixel set, adding a plurality of user-hair-color-model entries to the user hair-color model. The entries correspond to a color of the pixel as well as colors that are within a threshold tolerance of the color of the pixel.

In at least one embodiment, grouping the pixels includes employing an expectation maximization algorithm to group the pixels. In at least one embodiment, grouping the pixels includes employing a support vector machine algorithm to group the pixels. In at least one embodiment, grouping the pixels includes employing a Viterbi algorithm to group the pixels. In at least one embodiment, grouping the pixels includes employing a k-means clustering algorithm to group the pixels.

In at least one embodiment, within a given k-means initial configuration, the two initial mean colors that are configuration-independent and the one initial mean color that is configuration-dependent are the same for each line segment in the set of line segments.

In at least one embodiment, within a given k-means initial configuration, the two initial mean colors that are configuration-independent and the one initial mean color that is configuration-dependent are not the same for each line segment in the set of line segments.

In at least one embodiment, one of the two configuration-independent initial mean colors is representative of a color of a face of the user.

In at least one such embodiment, the process further includes generating, for each line segment, a respective configuration-independent initial mean color that is representative of the color of the face of the user at least in part by (i) determining a region within the video data that resides at a center of the head of the user, and (ii) calculating the configuration-independent initial mean color that is representative of the color of the face of the user to be an average of respective colors of the pixels located within the region.

In at least one other such embodiment, the process further includes generating, for each line segment, a respective configuration-independent initial mean color that is representative of the color of the face of the user at least in part by (i) determining a region within the video data that resides at an interior end of the line segment, and (ii) calculating the configuration-independent initial mean color that is representative of the color of the face of the user to be an average of respective colors of the pixels located within the region.

In at least one embodiment, one of the two configuration-independent initial mean colors is representative of a color of a background.

In at least one such embodiment, the process further includes generating, for each line segment, a respective configuration-independent initial mean color that is representative of the color of the background at least in part by (i) determining a region within the video data that, in its entirety, resides substantially above the upper contour, and (ii) calculating the configuration-independent initial mean color that is representative of the color of the background to be an average of respective colors of the pixels located within the region.

In at least one other such embodiment, the process further includes generating, for each line segment, a respective configuration-independent initial mean color that is representative of the color of the background at least in part by (i) determining a region within the video data that resides at an exterior end of the line segment, and (ii) calculating the configuration-independent initial mean color that is representative of the color of the background to be an average of respective colors of the pixels located within the region.

In at least one embodiment, the configuration-dependent initial mean color is representative of a color of hair of the user.

In at least one such embodiment, the process further includes generating, for each line segment, a respective configuration-dependent initial mean color that is representative of the color of the hair of the user at least in part by (i) determining a region within the video data that is bisected by the upper contour, and (ii) calculating the configuration-dependent initial mean color that is representative of the color of the hair of the user to be an average of respective colors of the pixels located within the region. In at least one further embodiment, the region is bisected by both the contour and the line segment.

In at least one other such embodiment, the process further includes generating, for each line segment, a respective configuration-dependent initial mean color that is representative of the color of the hair of the user at least in part by (i) determining a region within the video data that, in its entirety, resides immediately below the upper contour, and (ii) calculating the configuration-dependent initial mean color that is representative of the color of the hair of the user to be an average of respective colors of the pixels located within the region. In at least one further embodiment, the region is bisected by the line segment.

In at least one other such embodiment, the process further includes generating, for each line segment, a respective configuration-dependent initial mean color that is representative of the color of the hair of the user at least in part by (i) determining a region within the video data that, in its entirety, resides immediately above the upper contour, and (ii) calculating the configuration-dependent initial mean color that is representative of the color of the hair of the user to be an average of respective colors of the pixels located within the region. In at least one further embodiment, the region is bisected by the line segment.

In at least one other such embodiment, the process further includes generating, for each line segment, a respective configuration-dependent initial mean color that is representative of the color of the hair of the user at least in part by, for a first k-means initial configuration, (i) determining a first region within the video data, wherein the first region is bisected by the upper contour, and (ii) calculating a first configuration-dependent initial mean color that is representative of the color of the hair of the user to be an average of respective colors of the pixels located within the first region. Such a process further includes, for a second k-means initial configuration, (iii) determining a second region within the video data, wherein the entirety of the second region resides below the upper contour, and (iv) calculating a second configuration-dependent initial mean color that is representative of the color of the hair of the user to be an average of respective colors of the pixels located within the second region.

In at least one embodiment, using the final mean colors derived from the configuration-dependent initial mean colors to identify the respective set of hair-color pixels from the pixels in the line segments includes, for each line segment in the set of line segments, (i) selecting each pixel in the line segment that has a color closer to the final mean color that was derived from the configuration-dependent initial mean color than to either of the other two final mean colors, and (ii) identifying the respective set of hair-color pixels as the selected pixels. In at least one such embodiment, selecting one of the identified sets of hair-color pixels based on one or more hair-color-pixel-set criteria includes selecting whichever identified set of hair-color pixels is larger.

In at least one embodiment, using the final mean colors derived from the configuration-dependent initial mean colors to identify the respective set of hair-color pixels from the pixels in the line segments includes, for each line segment in the set of line segments, (i) selecting a longest continuous group of pixels in the line segment. wherein each pixel in the group has a color that is closer to the final mean color that was derived from the configuration-dependent initial mean color than to either of the other two final mean colors, and (ii) identifying the respective set of hair-color pixels as the pixels in the longest continuous groups. In at least one such embodiment, selecting one of the identified sets of hair-color pixels based on one or more hair-color-pixel-set criteria includes selecting whichever identified set of hair-color pixels is larger.

In at least one embodiment, using the final mean colors derived from the configuration-dependent initial mean colors to identify the respective set of hair-color pixels from the pixels in the line segments includes, for each line segment in the set of line segments, (i) selecting a longest continuous group of pixels in the line segment, wherein each pixel in the group has a color that is closer to the final mean color that was derived from the configuration-dependent initial mean color than to either of the other two final mean colors, (ii) selecting the longest continuous groups that exceed a threshold length, and (iii) identifying the respective set of hair-color pixels as the pixels in the selected longest continuous groups.

In at least one such embodiment, selecting one of the identified sets of hair-color pixels based on one or more hair-color-pixel-set criteria includes selecting whichever identified set of hair-color pixels is larger.

In at least one other such embodiment, selecting one of the identified sets of hair-color pixels based on one or more hair-color-pixel-set criteria includes selecting whichever identified set of hair-color pixels includes more selected longest continuous groups.

In at least one embodiment, using the selected set of hair-color pixels to generate the user-hair-color model includes, for each pixel in the selected set of hair-color pixels, adding a singular hair-color-model entry corresponding to a color of the pixel.

In at least one embodiment, using the selected set of hair-color pixels to generate the user-hair-color model includes, for each pixel in the selected set of hair-color pixels, adding a plurality of user-hair-color-model entries corresponding to a color of the pixel as well as colors that are close to the color of the pixel.

At a high level, the systems and processes described herein use video data and novel processing techniques to generate a user-hair-color model. The video data depicts a head of a user. The user may or may not have hair on the top of their head. The user-hair-color model is a construct that estimates which color values (e.g., RGB color values) are part of the user's hair and how often each color value is depicted in the user's hair. It is sufficient to use a portion of the user's hair to generate the user-hair-color model, however, it is often difficult to determine an exact portion to use. This difficulty arises, at least in part, due to the unreliability of depth data associated with the video data.

Depending on the nature of the obtained video data and the obtained depth data, pixels may take on a plurality of forms.

In scenarios wherein a single frame of information includes both video data and depth data, pixels in such a frame include both color information and depth information. In such a scenario the term depth pixel references the depth value of a pixel and the terms pixel of video data, color pixel, and the like reference the color value of the pixel. In such a scenario the term pixel may be used to reference either or both the color information and the depth information. Of course, any pixel has an associated location and even when not explicated stated this would be well known by those with skill in the art.

In scenarios wherein there are separate frames of video data and depth data there is a correspondence between the frames of video data and the frames of depth data. Therefore, if a depth pixel is identified within a frame of depth data it is evident that a corresponding pixel of video data may be included within that identification and vice versa.

At least aspect of the motivation behind the methods and systems described herein is the realization that sometimes depth data associated with the video data includes hair of the user and other times depth data associated with the video data does not include hair of the user. Many factors play a role with respect to a depth camera's ability to detect a user's hair. The color of the user's hair as well as the thickness and fullness of the user's hair have an impact on a depth camera's ability to sense the user's hair. Therefore, depth data (in some cases, depth data obtained via a depth camera and in other cases depth data obtained via a data store) is assumed to always include detection of the user's face, and is assumed to sometimes include detection of the user's hair. In many embodiments, depth data is used to identify an upper portion of the head of the user. In these embodiments, the upper portion may indicate (i) a boundary between the user's forehead and the user's hair (e.g., when the depth data does not depicts the user's hair) or (ii) a boundary between the user's hair and a background (e.g., when the depth data does depict the user's hair). For the balance of this disclosure, the exact position of the upper contour with respect to the user's facial features is an unknown that can take on one of the two above listed possibilities or something in between the two (i.e., within the user's hair).

At least one other aspect of the motivation behind the methods and systems described herein is the susceptibility of k-means clustering processes with respect to initial configurations (e.g., sets of initial means and/or initial clusters). A single k-means analysis operates on each line segment in the set of line segments individually, at least in part by using an initial configuration. An initial configuration is a set of initial conditions—one initial condition for each line segments in the set of line segments—that is to be used for a single k-means analysis. An initial condition is a set of three initial means and/or a set of three initial clusters.

As it is a heuristic algorithm, there is no guarantee that a k-means process will converge to the global optimum, and the result may depend on the initial means. As the analysis is usually very fast, it is beneficial to run it multiple times with different initial configurations (e.g., different starting means for each line segment in the set of line segments). In the context of the systems and process disclosed herein, a k-means clustering performed on a single line segment is used to identify three final mean colors on the given line segment. Each pixel in the line segment will be associated with one of the three identified final mean colors based on whichever identified final mean color is closest to a color of that pixel. A set of line segments are selected and a number of k-means clusterings is performed on each line segment in the set (oftentimes more than once, each time using different initial conditions—this increases the probability that one of the more than one k-means clusterings converges on the global optimum).

A user-hair-color model and a background-color model may each take on a plurality of forms. In general each model is used to indicate which colors are representative of a user-hair color and a background of the video data respectively. The models may take on the form of a histogram, a machine learning classifier, a Gaussian mixture, an array of color values and respective color counts, and the like.

In general, any indication, classification, assignment, and the like of pixels, regions, portions, and the like of the video data is relevant within the scope of the systems and processes described herein. As this disclosure describes systems and processes that may be used as part of a comprehensive user-extraction process, it is explicitly noted that it is not required that any classification of pixels as foreground or background be definitive with respect to the entire user-extraction process.

In some embodiments, the systems and processes described herein employ one of a number of types of grouping algorithms. In the balance of this disclosure a k-means clustering algorithm is used as an example of such a grouping algorithm. The systems and process described herein that utilize a k-means algorithm could alternatively utilize any of the other listed grouping algorithms (e.g., a Viterbi algorithm or an expectation maximization algorithm) and the like, as would be known by those with skill in the relevant art. Small variations to the k-means specific embodiments may be required in order to accommodate an alternative grouping algorithm but such variations would be apparent to those of skill in the art in view of the present disclosure.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
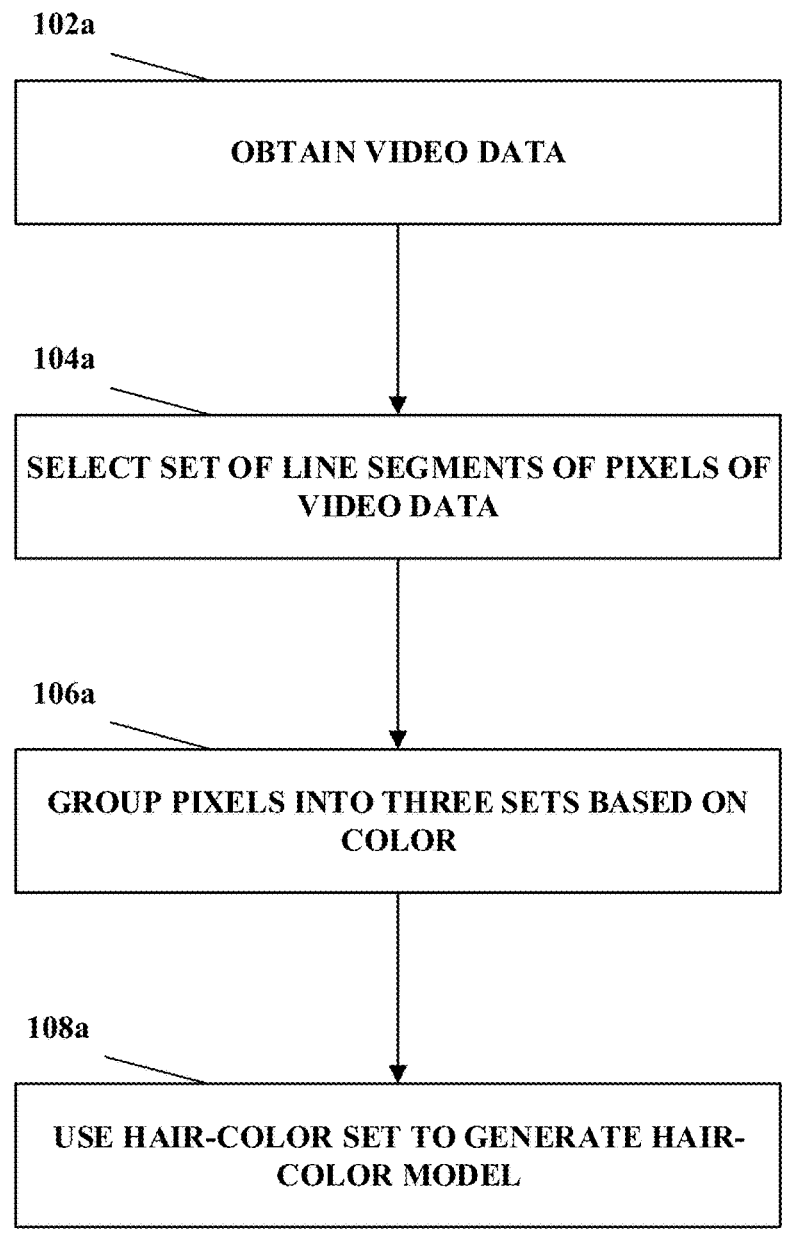
FIG. 1A depicts a first example process, in accordance with at least one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in this detailed description.

FIG. 1A depicts an example process, in accordance with at least one embodiment. In particular, FIG. 1A depicts an example process 100a that includes elements 102a-108a. Although primarily depicted and described as being performed serially, at least a portion of the elements (steps) of the process 100a may be performed contemporaneously, or in a different order than is depicted in and described in connection with FIG. 1A. Furthermore, in at least one embodiment, the process 100a is repeated, at some point in time, after any of the elements 102a-108a are completed. Additionally, repetition of the process 100a may or may not include performance of each element in the process 100a, and may commence at any of the elements 102a-108a. The process 100a is further described below.

The process 100a includes obtaining video data depicting a head of a user. The process 100a also includes determining a set of line segments of pixels of the video data. Each line segment in the determined set of line segments intersects an upper contour of the depicted head of the user. The process 100a also includes grouping at least some of the pixels of at least one of the line segments in the determined set of line segments into three sets of pixels based at least in part on respective color data of the pixels. The three sets of pixels include a skin-pixel set, a hair-pixel set, and a background-pixel set. The process 100a also includes updating a user hair-color model based at least in part on the hair-pixel set.

More specifically, at element 102a the process 100a includes obtaining video data depicting a head of a user. At element 104a the process 100a includes determining a set of line segments of pixels of the video data. Each line segment in the determined set of line segments intersects an upper contour of the depicted head of the user. Further explanation of the element 104a is included in the description for FIGS. 6 & 7. At element 106a the process 100a includes grouping at least some of the pixels of at least one of the line segments in the determined set of line segments into three sets of pixels based at least in part on respective color data of the pixels. The three sets of pixels include a skin-pixel set, a hair-pixel set, and a background-pixel set. A detailed example of the element 106a is further described with respect to a k-means process. Elements 108b-114b of FIG. 1B together describe grouping at least some of the pixels of at least one of the line segments in the determined set of line segments into three sets of pixels based at least in part on respective color data of the pixels. At element 108a the process 100a includes updating a user hair-color model based at least in part on the hair-pixel set.

Figure 1B:
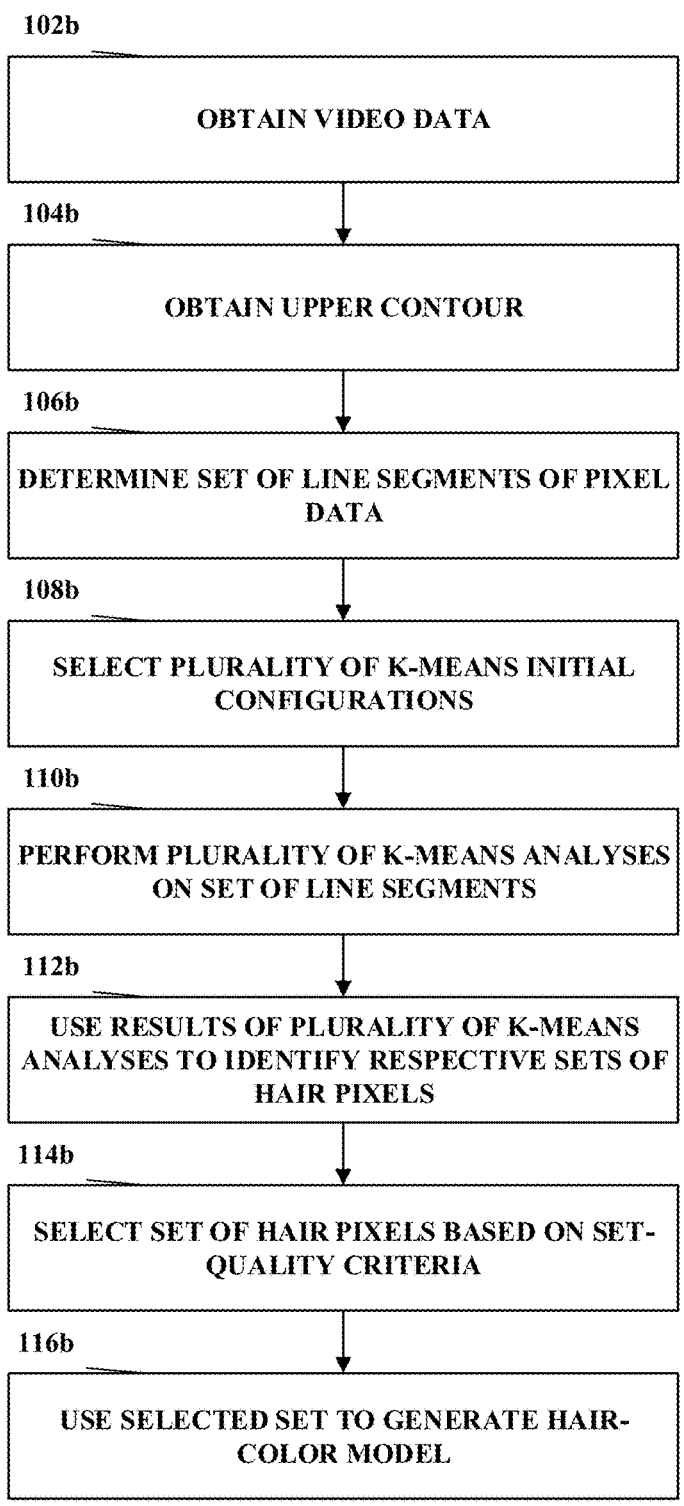
FIG. 1B depicts a second example process, in accordance with at least one embodiment.

FIG. 1B depicts a second example process, in accordance with at least one embodiment. In particular, FIG. 1B depicts an example process 100b that includes elements 102b-116b. Although primarily depicted and described as being performed serially, at least a portion of the elements (steps) of the process 100b may be performed contemporaneously, or in a different order than is depicted in and described in connection with FIG. 1B. Furthermore, in at least one embodiment, the process 100b is repeated, at some point in time, after any of the elements 102b-116b are completed. Additionally, repetition of the process 100b may or may not include performance of each element in the process 100b, and may commence at any of the elements 102b-116b. The process 100b is further described below.

One embodiment takes the form of the process 100b. The process 100b includes obtaining video data depicting a head of a user, obtaining an upper contour of the head of the user, and determining a set of line segments of pixel data, each line segment in the set crossing the upper contour. The process 100b also includes selecting a first number of k-means initial configurations. Each selected k-means initial configuration includes, for each line segment in the set of line segments, two initial mean colors that are configuration-independent and one initial mean color that is configuration-dependent. The process 100b also includes performing the first number of independent k-means analyses on the set of line segments. Each independent k-means analysis uses a different one of the selected k-means initial configurations and each independent k-means analysis identifies, for each line segment in the set of line segments, three final mean colors respectively derived from the three initial mean colors. The process 100*b* also includes, for each of the performed k-means analyses, using the final mean colors derived from the configuration-dependent initial mean colors to identify a respective set of hair-color pixels from the pixels in the line segments. The process 100*b* also includes selecting one of the identified sets of hair-color pixels based on one or more hair-color-pixel-set criteria. The process 100*b* also includes using the selected set of hair-color pixels to generate a user-hair-color model.

In one embodiment the first number is one. In such an embodiment, a single k-means analysis is performed on the set of line segments using one initial configuration (i.e., a respective initial condition for each line in the set of line segments, wherein the respective initial conditions may or may not be the same for each line segment in the set of line segments). Such a process includes using the final mean colors derived from the configuration-dependent initial mean colors to identify a set of hair-color pixels from the pixels in the line segments and then using the set of hair-color pixels to generate a user-hair-color model. Such an embodiment is advantageous in at least one aspect as it is quicker to perform one k-means analysis than it is to perform many. However, such a process may produce an inaccurate user-hair-color model a location of the upper contour with respect to the head of the user is unknown. Resultantly, selecting a region, based on the location of the upper contour, to use when generating an initial mean color that is representative of a hair color of the user is not guaranteed to produce a desired result.

In at least one embodiment, the first number is greater than one. Such an embodiment is advantageous in at least one aspect as it is more likely to produce an accurate user-hair-color model. Because the location of the upper contour with respect to the head of the user is unknown it is advantages to perform many k-means analyses with many different initial configurations. Resultantly, selecting larger numbers of different regions, based on the location of the upper contour, to use when generating an initial mean color that is representative of a hair color increases the probability that the user-hair-color model is an accurate representation of the user's actual hair color.

At element 102*b* the process 100*b* includes obtaining video data depicting a head of a user. At element 104*b* the process 100*b* includes obtaining an upper contour of the head of the user. At element 106*b* the process 100*b* includes determining a set of line segments of pixel data, each line segment in the set crossing the upper contour. At element 108*b* the process 100*b* includes selecting a first number of k-means initial configurations, each selected k-means initial configuration including, for each line segment in the set of line segments, two initial mean colors that are configuration-independent and one initial mean color that is configuration. At element 110*b* the process 100*b* includes performing the first number of independent k-means analyses on the set of line segments, each independent k-means analysis (i) using a different one of the selected k-means initial configurations and (ii) identifying, for each line segment in the set of line segments, three final mean colors respectively derived from the three initial mean colors. At element 112*b* the process 100*b* includes for each of the performed k-means analyses, using the final mean colors derived from the configuration-dependent initial mean colors to identify a respective set of hair-color pixels from the pixels in the line segments. At element 114*b* the process 100*b* includes selecting one of the identified sets of hair-color pixels based on one or more hair-color-pixel-set criteria. At element 116*b* the process 100*b* includes using the selected set of hair-color pixels to generate a hair-color model.

In at least one embodiment, within a given k-means initial configuration, the two initial mean colors that are configuration-independent and the one initial mean color that is configuration-dependent are the same for each line segment in the set of line segments and in at least one other embodiment, within a given k-means initial configuration, the two initial mean colors that are configuration-independent and the one initial mean color that is configuration-dependent are not the same for each line segment in the set of line segments.

In at least one embodiment, one of the two configuration-independent initial mean colors is representative of a color of a face of the user, the other one of the two configuration-independent initial mean colors is representative of a color of a background, and the configuration-dependent initial mean color is representative of a color of hair of the user.

Figure 2:
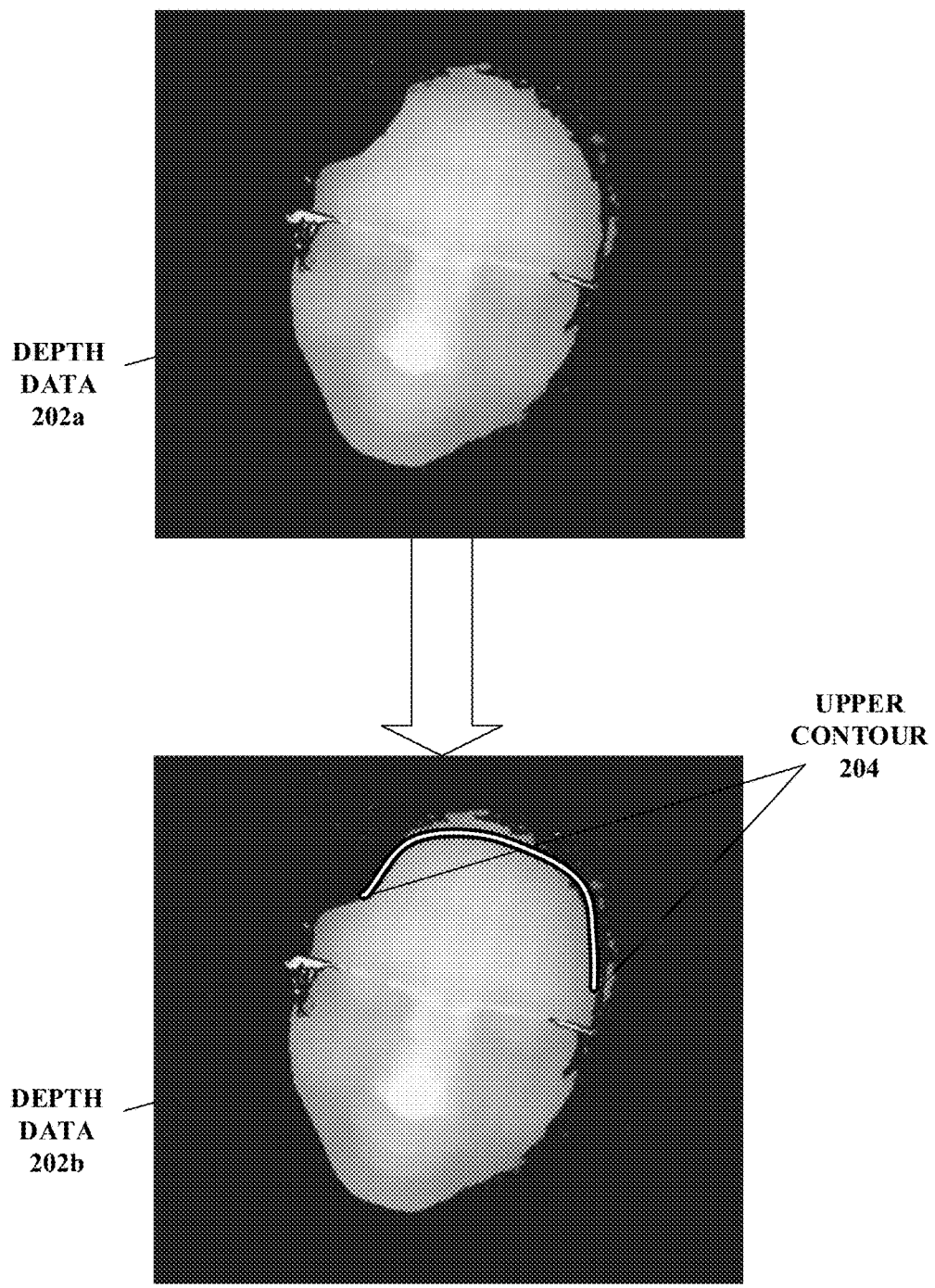
FIG. 2 depicts a generation of an upper contour using depth data, in accordance with an embodiment.

FIG. 2 depicts a generation of an upper contour using depth data, in accordance with an embodiment. In particular, FIG. 2 depicts a conceptual overview 200 that includes depth data 202*a*, and depth data 202*b* with an upper contour 204. The depth data 202*a* may represent a first frame of depth data. The depth data may be generated via a depth camera, 3-D camera, or the like and may be obtained via a communication interface. The depth data 202*a* may alternatively be obtained via a data store. The depth data 202*b* depicts the same depth data as the depth data 202*a*, but additionally includes an overlay of the upper contour 204.

The depth data 202*a* may correspond with one or more frames of video data. A mapping of depth values of pixels to color values of pixels within the frames may be included. Alternatively, each pixel in a frame of video data may include color and depth information inherently as described previously in the Overview.

In at least one embodiment, obtaining the upper contour 204 of the head of the user comprises generating the upper contour of the head of the user based at least in part on depth data (i.e., the depth data 202*a* or equivalently the depth data 202*b*) associated with the video data. The upper contour may be detected, for example, using image processing library functions such as the "contours2.cpp" function of opencv (open source computer vision), available from opencv.org. A further description of one example of this process is discussed in relation with FIG. 3.

Figure 3:
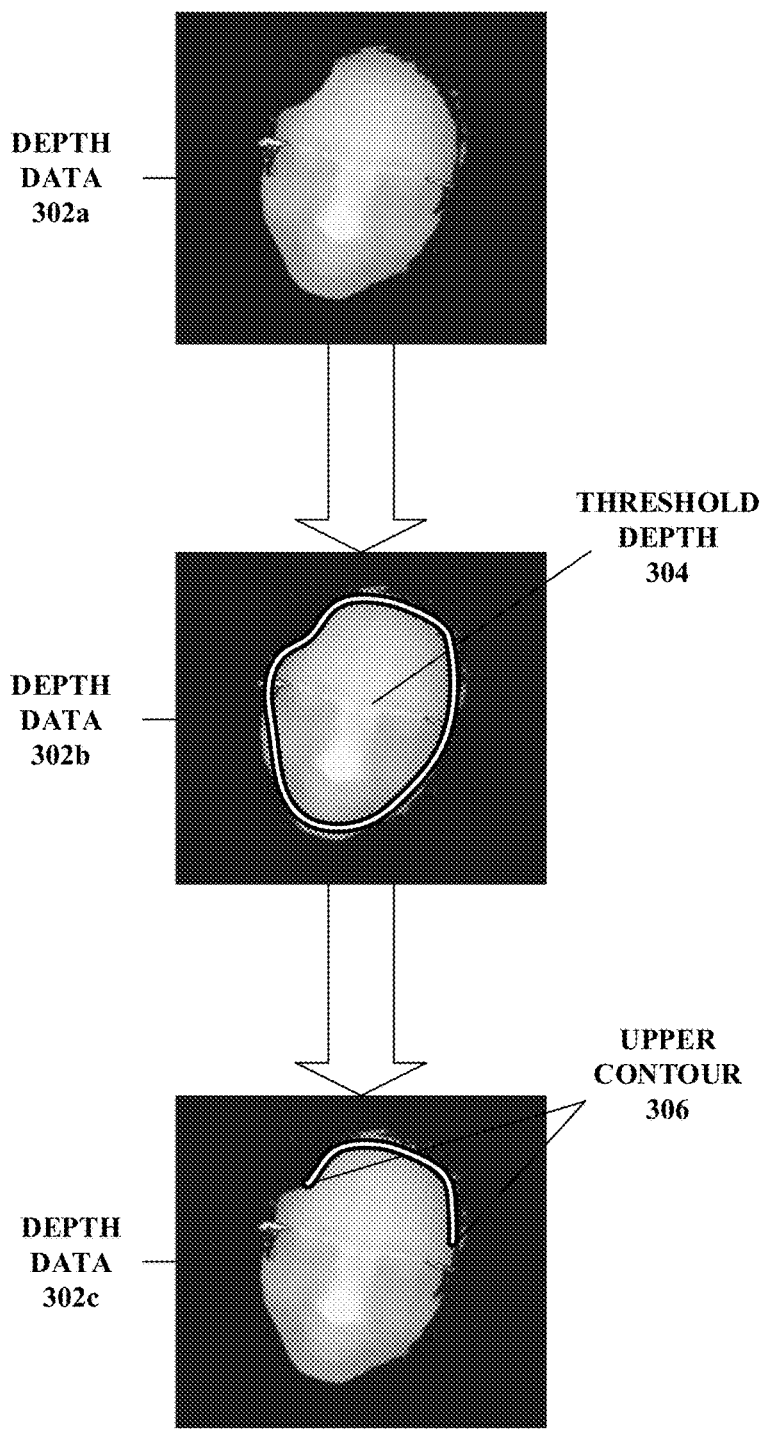
FIG. 3 depicts a generation of an upper contour using a threshold depth value, in accordance with an embodiment.

FIG. 3 depicts a generation of an upper contour using a threshold depth value, in accordance with an embodiment. In particular, FIG. 3 depicts a conceptual overview 300 that includes depth data 302*a*, depth data 302*b* with an identified region of threshold depth 304, and depth data 302*c* with an upper contour 306. The depth data 302*a* may represent a first frame of depth data. The depth data may be generated via a depth camera, 3-D camera, or the like and obtained via a communication interface. The depth data 302*a* may alternatively be obtained via a data store. The depth data 302*b* and 302*c* depict the same depth data as the depth data 302*a*, but additionally show the threshold depth 304 and the upper contour 306 respectively.

In at least one embodiment, wherein generating the upper contour 306 is based at least in part on depth data (i.e., the depth data 302*a* or equivalently the depth data 302*b* and 302*c*) associated with the video data, generating the upper contour 306 is based at least in part on the threshold depth

304. In an alternative embodiment, the contour is detected at least in part based on the video image data.

As depicted in the conceptual overview 300, a region is identified, wherein the region corresponds with depth values that fall within the depth threshold 304. The depth threshold 304 may be a single value or a range of values (e.g., the depth threshold 304 may indicate a region of depth values that are greater than a particular depth value, less than a particular depth value, included within a range of depth values, or excluded from a range of depth values). For example, the threshold depth 304 could correspond to a region with depth values greater than 20 cm from a depth camera but less than 35 cm from the depth camera.

In some embodiments, the threshold depth 304 is a set value, or range of values, that is obtained via a data store. It is immutable and is hard-coded into the systems and processes described herein. In some other embodiments, the threshold depth 304 is generated through an analysis of the depth data 302*a-c*. For example, a sub-process can identify for a frame of depth data, two ranges of depth values that respectively correspond to a foreground region and a background region of the video data, and responsively define the threshold depth 304 to segment the two ranges.

Furthermore, a boundary of the threshold depth 304 may be used to define a head contour. A head contour estimates the outline of a head of a user. The head contour may encompass the user's hair or may not encompass the user's hair, depending on the characteristics of the user's hair as well as the properties of the depth camera used to capture the depth data 302*a*. Resultantly, the upper contour 306 may indicate a hair-background boundary or a forehead-hair boundary. It is assumed that the upper contour 306 takes on one of these two qualities and the systems and processes described herein teach a technique for generating a user-hair-color model in view of this unknown variable.

In some cases, more than one region is identified, wherein the more than one regions each correspond with depth values that fall within the threshold depth 304. In order to define the head contour one of the more than one regions must be selected. In one embodiment, face detection is used to determine the selected region. In another embodiment, a head box is employed. A head box is a region of pixels that are known to be part of the head. Determining the selected region includes comparing a respective amount of area overlap between each the identified regions and the head box and determining the selected region to be whichever of the identified regions is associated with a greater amount of area overlap with the head box.

Figure 4:
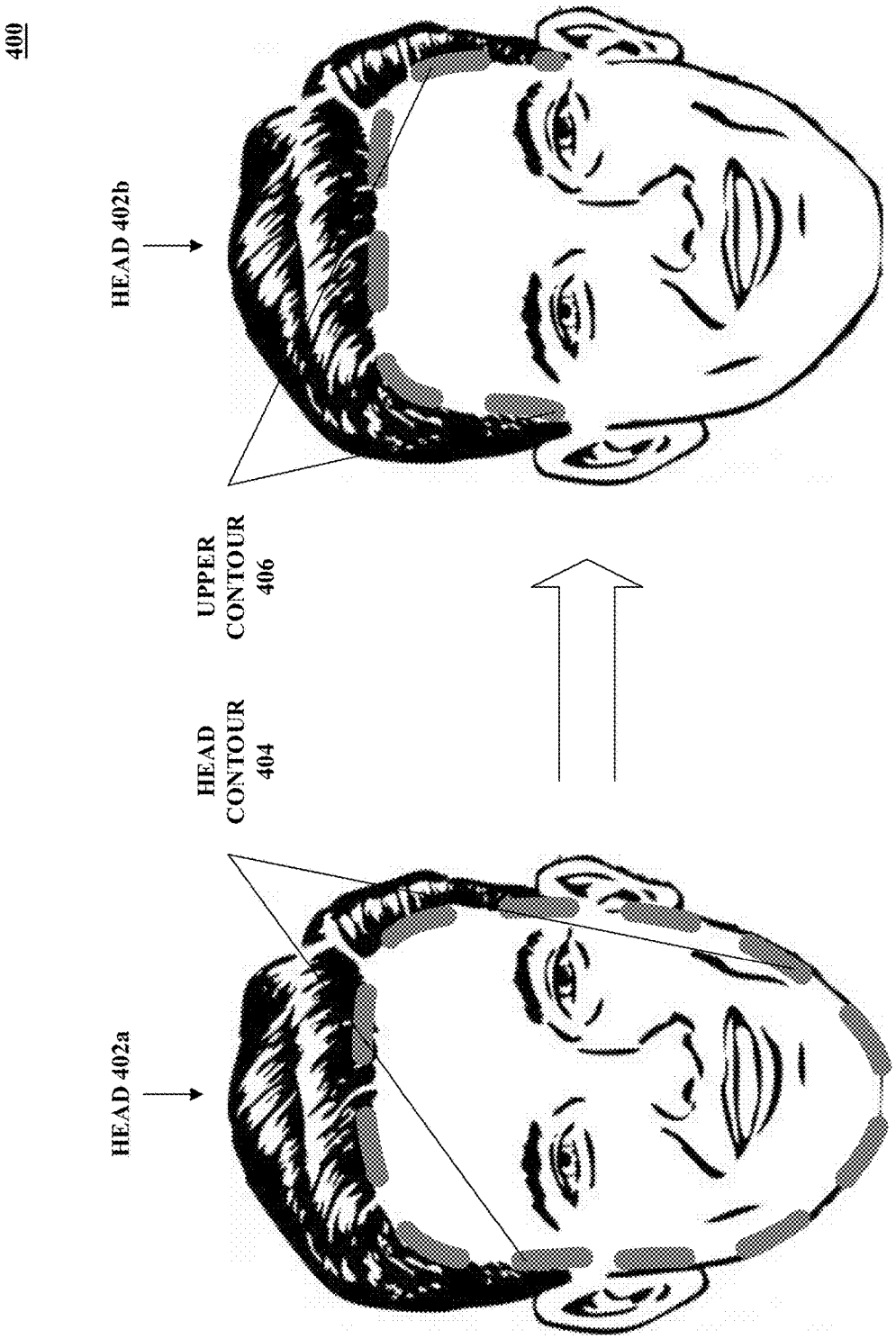
FIG. 4 depicts a first example generation of an upper contour using a head contour, in accordance with an embodiment.

FIG. 4 depicts a first example generation of an upper contour using a head contour, in accordance with an embodiment. In particular, FIG. 4 depicts a conceptual overview 400 that includes the head of the user, head 402*a* and head 402*b*. The head 402*a-b* may be found in a frame of video data and both the head 402*a* and the head 402*b* depict the same video data. The head 402*a* has a head contour 404 shown and the head 402*b* has an upper contour 406 shown.

In at least one embodiment, obtaining the upper contour 406 of the head 402*a* (or equivalently head 402*b*) of the user comprises (i) obtaining a head contour 404 that estimates an outline of the head 402*a* (or equivalently head 402*b*) of the user, and (ii) identifying an upper portion of the obtained head contour 404 as being the upper contour 406 of the head 402*a* (or equivalently head 402*b*) of the user. The head contour 404 may be obtained at least in part using depth data associated with the video data, as described in connection with FIG. 3.

The head contour 404 outlines the user's face but does not include the user's hair, therefore the identified upper portion of the head contour 404 lies between the user's forehead and the user's hair. In turn, the upper contour 406, lies between the user's forehead and the user's hair.

Figure 5:
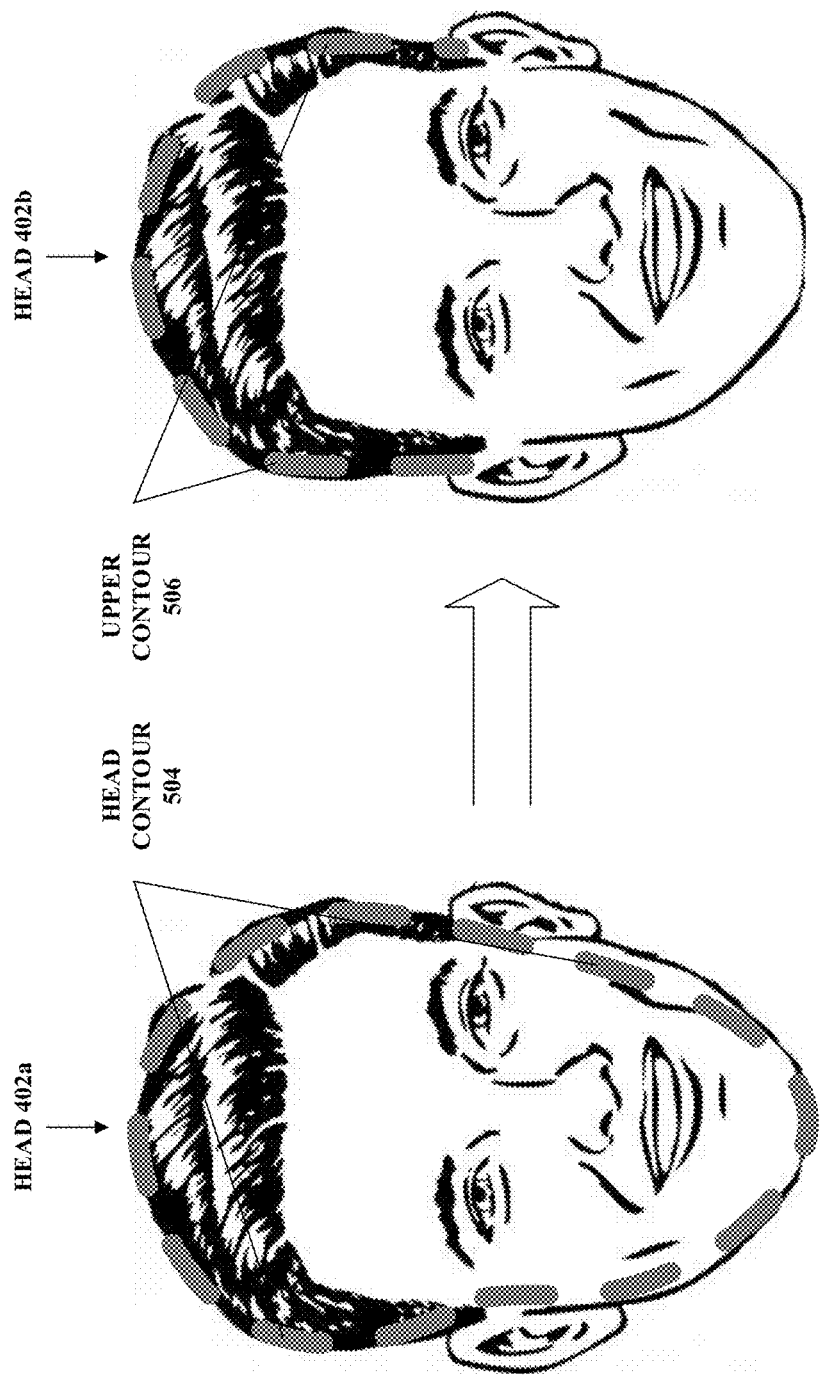
FIG. 5 depicts a second example generation of an upper contour using a head contour, in accordance with an embodiment.

FIG. 5 depicts a second example generation of an upper contour using a head contour, in accordance with an embodiment. In particular, FIG. 5 depicts a conceptual overview 500 that includes the head of the user, head 402*a* and head 402*b*. The head 402*a-b* may be found in a frame of video data and both the head 402*a* and the head 402*b* depict the same video data. The head 402*a* has a head contour 504 shown and the head 402*b* has an upper contour 506 shown.

In at least one embodiment, obtaining the upper contour 506 of the head 402*a* (or equivalently head 402*b*) of the user comprises (i) obtaining a head contour 504 that estimates an outline of the head 402*a* (or equivalently head 402*b*) of the user, and (ii) identifying an upper portion of the obtained head contour 504 as being the upper contour 506 of the head 402*a* (or equivalently head 402*b*) of the user. The head contour 504 may be obtained at least in part using depth data associated with the video data, as described in connection with FIG. 3.

The head contour 504 outlines the user's head including the user's hair, therefore the identified upper portion of the head contour 504 lies between the user's hair and a background portion of the video data. In turn, the upper contour 506, lies between the user's hair and a background portion of the video data. The background portion may be determined using the depth data associated with the video data.

The previous portion of this detailed description, with respect to FIGS. 4 & 5, highlights two possible upper contour qualities. In FIG. 4 the head contour 404 does not encompass the user's hair so the upper contour 406 is identified as bordering the user's forehead and the user's hair. In FIG. 5 the head contour 504 does encompass the user's hair so the upper contour 506 is identified as bordering the user's hair and a background in the video data. The background may be determined using the depth data associated with the video data.

Figure 6:
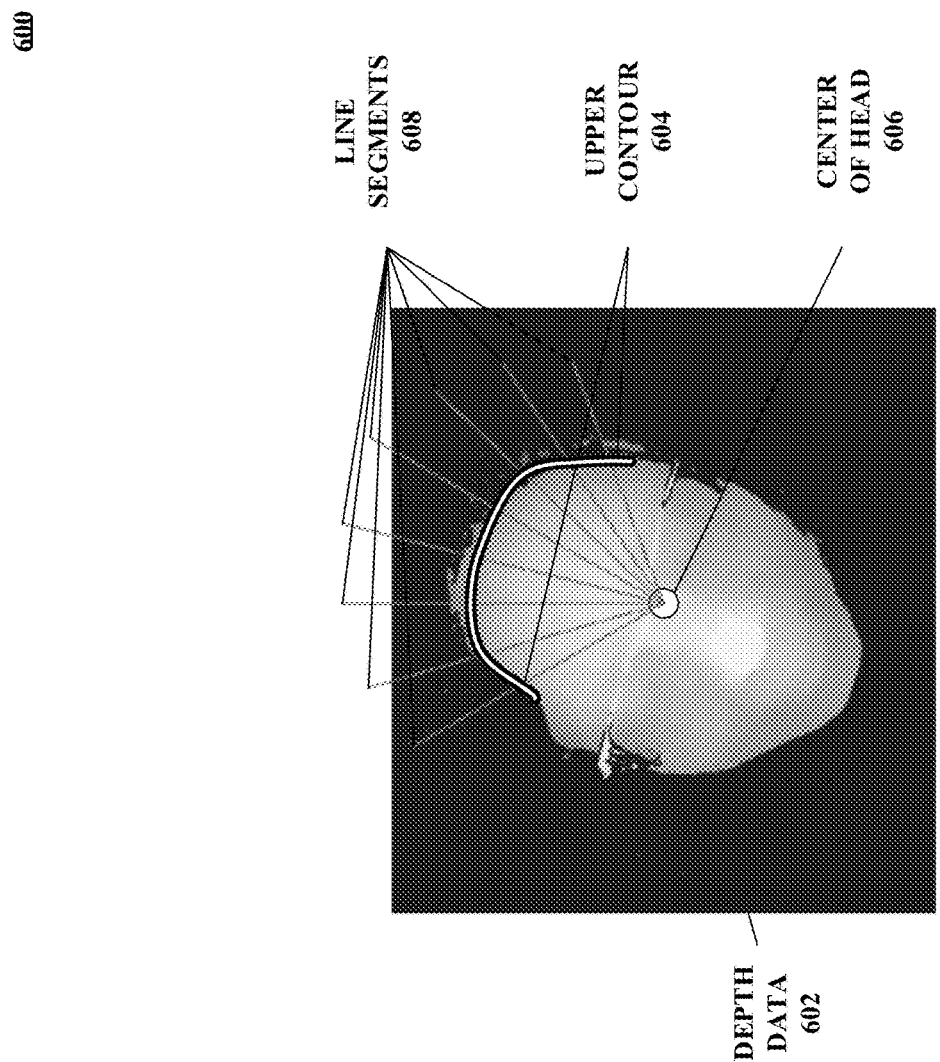
FIG. 6 depicts a first set of line segments, in accordance with an embodiment.

FIG. 6 depicts a first set of line segments, in accordance with an embodiment. In particular, FIG. 6 depicts a graphical overview 600 that includes depth data 602, an upper contour 604, a center of head 606, as well as line segments 608. The depth data 602 may represent a first frame of depth data. The depth data may be generated via a depth camera, 3-D camera, or the like and obtained via a communication interface. The depth data 602 may alternatively be obtained via a data store. In the graphical overview 600, the depth data 602 is used to help clarify spatial relationships between the upper contour 604, the center of head 606, and the line segments 608. An alternative depiction of the graphical overview 600 could use a frame of video data in place of the depth data 602. The upper contour 604 may be obtained via the methods discussed in relation to FIGS. 2-5.

The center of head 606 represents an estimation of the center of the head of the user. The center of head 606 may be identified by calculating a geometric center of a head contour. In another example, the center of head 606 is identified as being a nose of the user. Of course the two previously listed examples for identifying the center of head 606 are provided by way of example and are not meant to be limiting in any way. Of course, a variety of image and depth processing techniques may be used to identify the center of head 606, as is well known by those with skill in the relevant art.

The line segments 608 each start from the identified center of head 606 and pass through the upper contour 604. The line segments 608 may include any plural number of line segments. Each line segment included in the line segments 608 may be equally distributed with respect to an angle between each segment. Each line segment included in the line segments 608 may be equally distributed with respect to a length along the upper contour 604. Alternatively, the line segments 608 need not be equally distributed in any fashion. Each line segment included in the line segments 608 may be one pixel in width or may be greater than one pixel in width.

In at least one embodiment, determining the set of line segments of pixels includes three steps. A first step includes identifying the center of head 606 of the user. A second step includes selecting a plurality of line segments (i.e., the line segments 608) originating from the identified center of head 606 of the user and crossing the upper contour 604. A third step includes determining the set of line segments of pixels to be the selected plurality (e.g., determining the set of line segments that are used for further processing to be the line segments 608).

In at least one embodiment, each line segment in the line segments 608 crosses the upper contour 604 and extends into a background portion of the video data. The background portion may be determined using the depth data associated with the video data.

In at least one embodiment, the line segments 608 do not originate from the identified center of head 606, however if they were extended they would pass through the center of head 606. In such an embodiment the line segments 608 start within a forehead region of the user, cross the upper contour 604, and extend into a background region of the video data.

Figure 7:
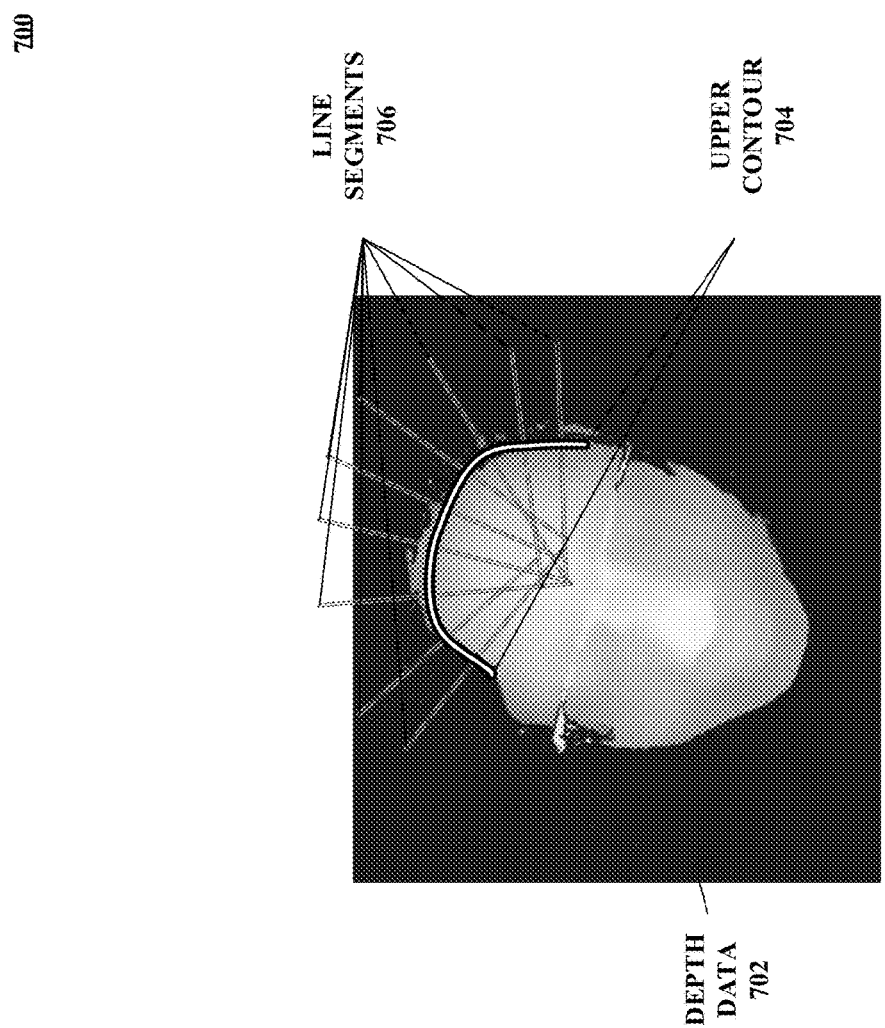
FIG. 7 depicts a second set of line segments, in accordance with an embodiment.

FIG. 7 depicts a second set of line segments, in accordance with an embodiment. In particular, FIG. 7 depicts a graphical overview 700 that includes depth data 702, an upper contour 704, and line segments 706. The depth data 702 may represent a first frame of depth data. The depth data may be generated via a depth camera, 3-D camera, or the like and obtained via a communication interface. The depth data 702 may alternatively be obtained via a data store. In the graphical overview 700, the depth data 702 is used to help clarify spatial relationships between the upper contour 704 and the line segments 706. An alternative depiction of the graphical overview 700 could use a frame of video data in place of the depth data 702. The upper contour 704 may be obtained via the methods discussed in relation to FIGS. 2-5.

Each of the line segments of pixels included in the line segments 706 is perpendicular to the upper contour 704. The upper contour 704 is used to generate a set of line segments normal to itself. The normal line segments extend into a background portion in an outer direction and extend into a forehead portion in an inward direction. These line segments 706 are determined to be the set of line segments of pixel data (e.g., determining the set of line segments that are used for further processing comprises determining the set of line segments to be the line segments 706). The line segments 706 may include any plural number of line segments. Additionally, in this paradigm, each line segment included in the line segments 706 may be equally distributed with respect to a length along the upper contour 704. Alternatively, the line segments 706 need not be equally distributed in any fashion.

In at least one embodiment, each line segment in the line segments 706 crosses the upper contour 704 and extends into a background portion of the video data, wherein the background portion is determined using the depth data associated with the video data.

Clustering is the process of partitioning a group of data points into a small number of clusters. For instance, the items in a supermarket are clustered in categories (butter, cheese and milk are grouped in dairy products). Of course this is a qualitative kind of partitioning. A quantitative approach would be to measure certain features of the products, say percentage of milk and others, and products with high percentage of milk would be grouped together. In general, we have n data points $x_i, i=1 \ldots n$ that have to be partitioned in k clusters. The goal is to assign a cluster to each data point. K-means is a clustering (i.e., grouping) method that aims to find the positions $\mu_i, i=1 \ldots k$ of the clusters that minimize the distance from the data points to the cluster. This problem is not trivial (in fact it is NP-hard), so the K-means algorithm only hopes to find the global minimum, possibly getting stuck in a different solution (i.e., a local minimum).

In this context of the systems and process described herein, each of the n data points is a color (e.g., an RGB value) corresponding to a pixel on a line segment in the set of line segments. In one embodiment such as K-means partitioning, each of the clusters will correspond with a single average color value and will map to a portion of pixels on the line segment. As an example, let there be 10 line segments in the set of line segments and let k=3. Each one of the 10 line segments must be broken up into 3 clusters, wherein each of the 30 clusters (10 line segments and three clusters for each segment) corresponds with an average color value. A 3-means clustering for a given line segment in the set of 10 line segments occurs independently from a 3-means clustering for any of the other nine line segments in the set of 10 line segments. 3-means-clustering results include, for each line segment in the set of 10 line segments, the 3 average color values of 3 mutually exclusive sets of pixels.

Clustering may also be achieved using a Viterbi algorithm, where predetermined permissible state transitions along a given line of pixels are evaluated. Such state transitions, for example, may include beginning at a face pixel "state" and continuing along the face-region of the line until transitioning to a hair region "state", then following the hair region along the line, and then finally transitioning to a background region "state". There are many possible paths that would result in the allowed sequence of state transitions. In particular, the Viterbi algorithm may determine the most likely transition points given the observations (pixel color, as well as depth information in some embodiments) by associating costs/likelihoods with possible state transition locations, and then for each pixel selecting the surviving path for each of the three possible states having the least cost metric. The transition points may then be used to identify the hair region cluster, and the colors of the pixels in the hair region may be used to generate a hair model.

Furthermore, in some embodiments, each of the 10 line segments may utilize a set of initial conditions (i.e., an initial configuration). Initial conditions are a first estimate of the three colors that each cluster will correspond with. In some embodiments, a Viterbi cost metric is determined with respect to an initial condition for face pixel colors, hair pixel colors, and background pixel colors. In some alternative embodiments the systems and processes described herein perform a k-means clustering on each line segment in the set of line segments, and in many embodiments this is done multiple times. Each time different initial conditions are used. Line segments in the set of line segments may share a common initial configuration or each employ a unique initial configuration within the context of a single k-means analysis.

The next portion of this detailed description, regarding FIGS. 8-11, discusses techniques for k-means initial configuration generation. In general, example regions used for generating configuration-independent means are described. As discussed above, each line segment in the set of line segments must be initialized with three means before undergoing a k-means clustering. It follows that each line segment in the set of line segments must be initialized with three means for each performed k-means analysis. For a given line segment, two of the initial means are used in each and every k-means analysis. These initial means are configuration-independent means. For a given k-means analysis, each line segment in the set of line segments may share common configuration-independent initial means or may have respective unique configuration-dependent initial means.

Of course the initial configuration (i.e., grouping algorithm parameters) generation techniques described below may be applied other grouping algorithms (e.g., expectation maximization, Viterbi, and the like) as would be understood by those with skill in the relevant art. Additionally, other types of equivalent grouping algorithm parameters (e.g., line segment color distribution models, initial group-transition locations along a line segment, etc.) may be generated using techniques known by those with skill in the art, even though those techniques are not explicitly referenced in the present disclosure.

Figure 8:
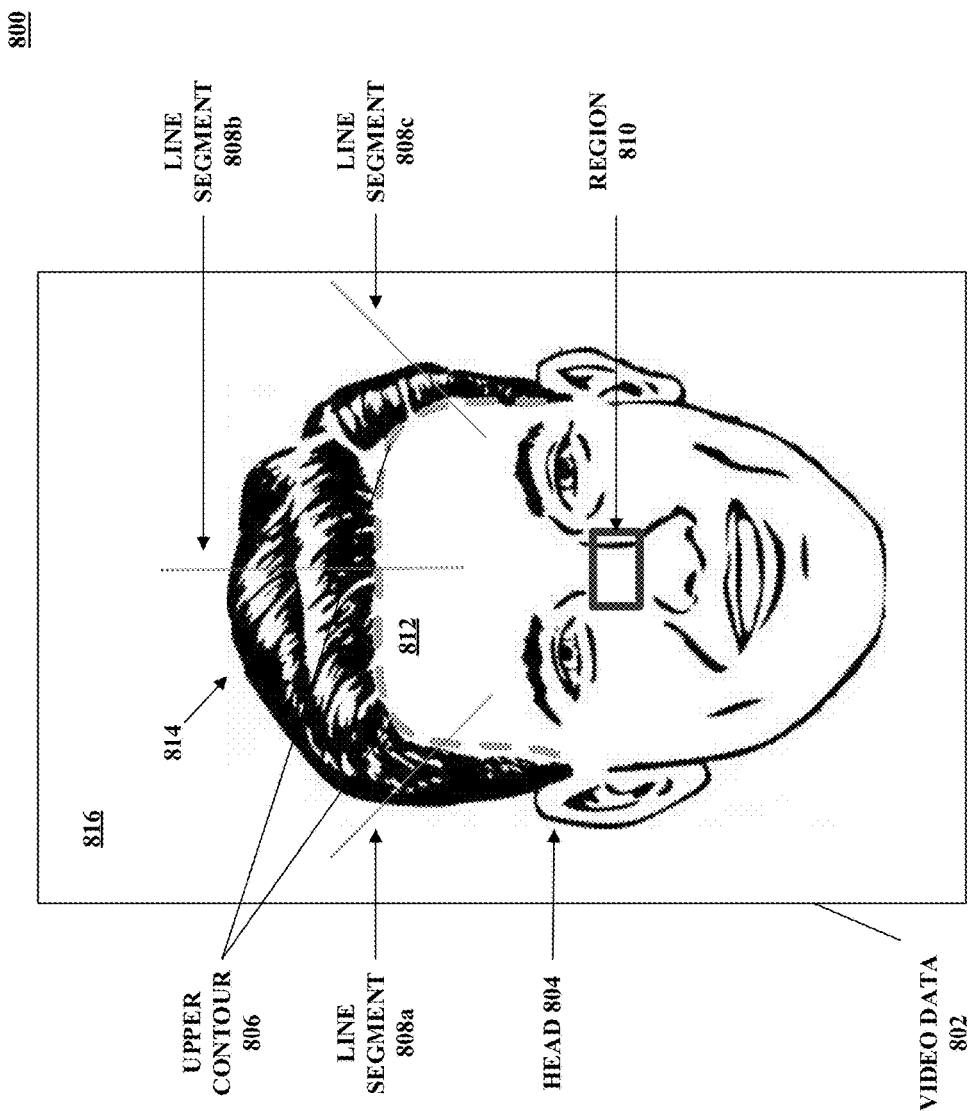
FIG. 8 depicts a first example region used for generating a configuration-independent initial mean color, in accordance with an embodiment.

FIG. 8 depicts a first example region used for generating a configuration-independent initial mean color, in accordance with an embodiment. In particular, FIG. 8 depicts a graphical overview 800 that includes video data 802. The video data 802 represents a single frame of video data. Depicted in the video data 802 is a head 804. An upper contour 806 and line segments 808a-c are also depicted in the graphical overview 800. The line segments 808a-c each cross the upper contour 806. The choice of three depicted line segments 808a-c is for the sake of visual simplicity. In many embodiments, there are more than three line segments and in other embodiments there are less than three line segments. The upper contour 806 is depicted as being a dashed line between a forehead 812 and hair 814, however an analogous figure could be constructed with an upper contour depicted as being between the hair 814 and a background 816 of the video data 802.

In at least one embodiment, the process 100b further includes generating, for each line segment 808a-c, a common configuration-independent initial mean color that is representative of the color of the face of the user at least in part by (i) determining a region within the video data 802 that resides at a center of the head 804 (i.e., determining a region 810), and (ii) calculating the configuration-independent initial mean color that is representative of the color of the face of the user to be an average of respective colors of the pixels located within the region 810.

The region 810, depicted in the graphical overview 800, is a first example region that may be used for generating a configuration-independent initial mean color representative of a color of a face of the user. The region 810 is a region that resides at a center of the head 804. Determining the location of the region 810 may be accomplished via a variety of means. In one embodiment, face detection is used on the video data 802 to determine a center of the head 804. In another embodiment, depth data is used to estimate the head 804 and a center of the head 804 is calculated from the depth data. The previous two examples for determining the center of the head 804 are provided by way of example and are not meant to be limiting in any way. Of course, many other techniques may be used to calculate the center of the head 804, as such a task is well known by those with skill in the relevant art. The regions 810 is depicted in FIG. 8 as a rectangle, but may take any suitable shape, as would be known by those with skill in the relevant art.

In the graphical overview 800, the configuration-independent initial mean color that is representative of the color of the face of the user is an average of respective colors of the pixels located within the region 810. In the graphical overview 800, the average of respective colors of the pixels located within the region 810 is used as the configuration-independent initial mean color representative of a color of a face of the user for each of the line segments 808a-c. Because the average of respective colors of the pixels located within the region 810 is a configuration-independent mean, the average of respective colors of the pixels located within the region 810 may be used for every k-means analysis (i.e., every set of k-means initial conditions or equivalently every k-means initial configuration) that is to be performed on the line segments 808a-c.

Figure 9:
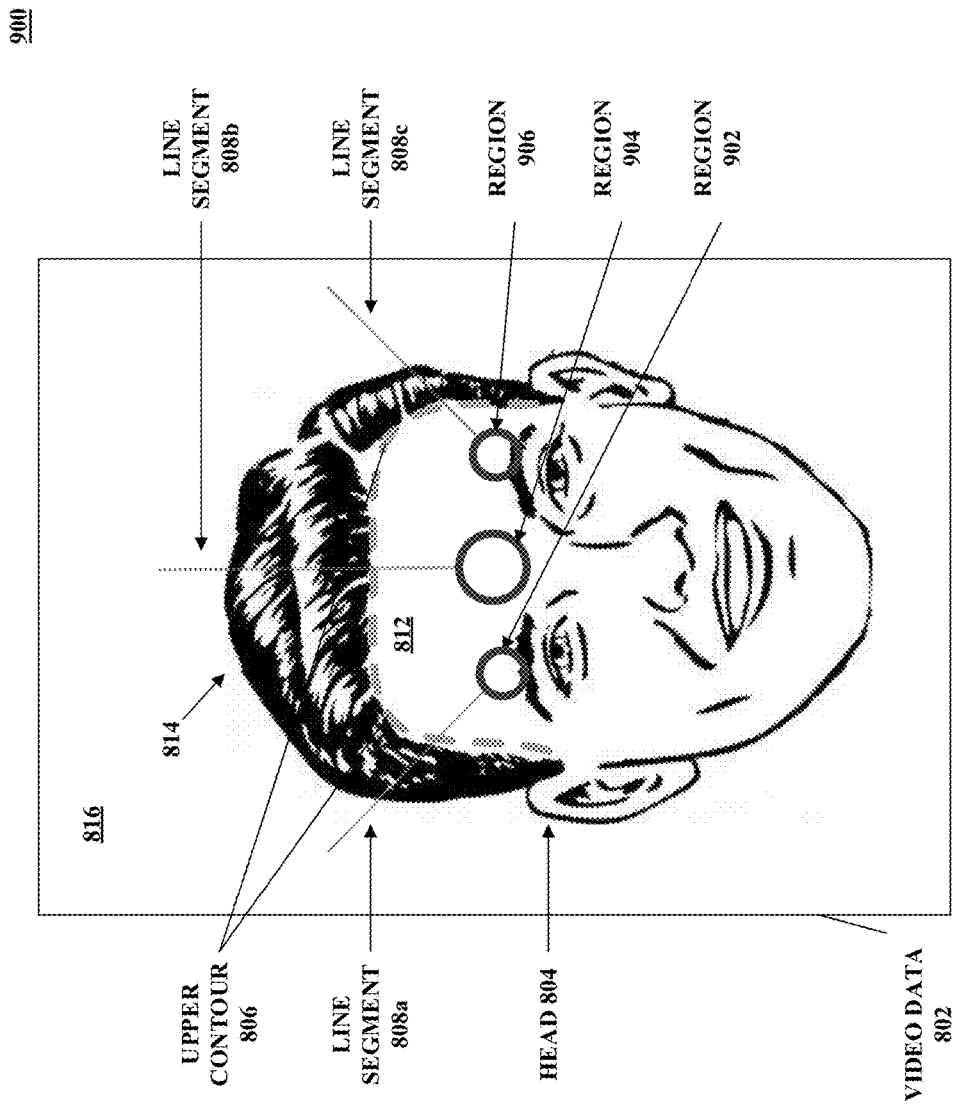
FIG. 9 depicts a first example set of regions used for generating configuration-independent initial mean colors, in accordance with an embodiment.

FIG. 9 depicts a first example set of regions used for generating configuration-independent initial mean colors, in accordance with an embodiment. In particular, FIG. 9 depicts a graphical overview 900 that includes the video data 802 of FIG. 8. Depicted in the video data 802 is the head 804 of FIG. 8. The upper contour 806 of FIG. 8 and the line segments 808a-c of FIG. 8 are also depicted in the graphical overview 900. The line segments 808a-c each cross the upper contour 806. The choice of three depicted line segments 808a-c is for the sake of visual simplicity. In many embodiments, there are more than three line segments and in other embodiments there are less than three line segments. The upper contour 806 is depicted as being a dashed line between a forehead 812 and hair 814, however an analogous figure could be constructed with an upper contour depicted as being between the hair 814 and a background 816 of the video data 802.

In at least one embodiment, the process 100b further includes generating, for each line segment 808a-c, a respective configuration-independent initial mean color that is representative of the color of the face of the user at least in part by (i) determining a region within the video data 802 that resides at an interior end of the line segment (i.e., determining a region 902 for the line segment 808a, a region 904 for the line segment 808b, and a region 906 for the line segment 808c), and (ii) calculating the configuration-independent initial mean color that is representative of the color of the face of the user to be an average of respective colors of the pixels located within the region 902 for the line segment 808a, the region 904 for the line segment 808b, and the region 906 for the line segment 808c.

The regions 902-906, depicted in the graphical overview 900, are a first example set of regions that may be used for generating configuration-independent initial mean colors representative of a color of a face of the user. The regions 902-906 are regions that respectively reside at interior ends of the line segments 808a-c. The regions 902-906 are depicted in FIG. 9 as circles, but may take any suitable shape, as would be known by those with skill in the relevant art.

In the graphical overview 900, the region 902 is used to generate an initial mean color that is representative of the color of the face for the line segment 808a. The region 904 is used to generate an initial mean color that is representative of the color of the face for the line segment 808b. The region 906 is used to generate an initial mean color that is representative of the color of the face for the line segment 808c. Because the respective averages of respective colors of the pixels located within the regions 902-906 are used as configuration-independent means, the respective averages of respective colors of the pixels located within the regions 902-906 may be used for every k-means analysis (i.e., every set of k-means initial conditions or equivalently every k-means initial configuration) that is to be performed on the line segments 808a-c.

Figure 10:
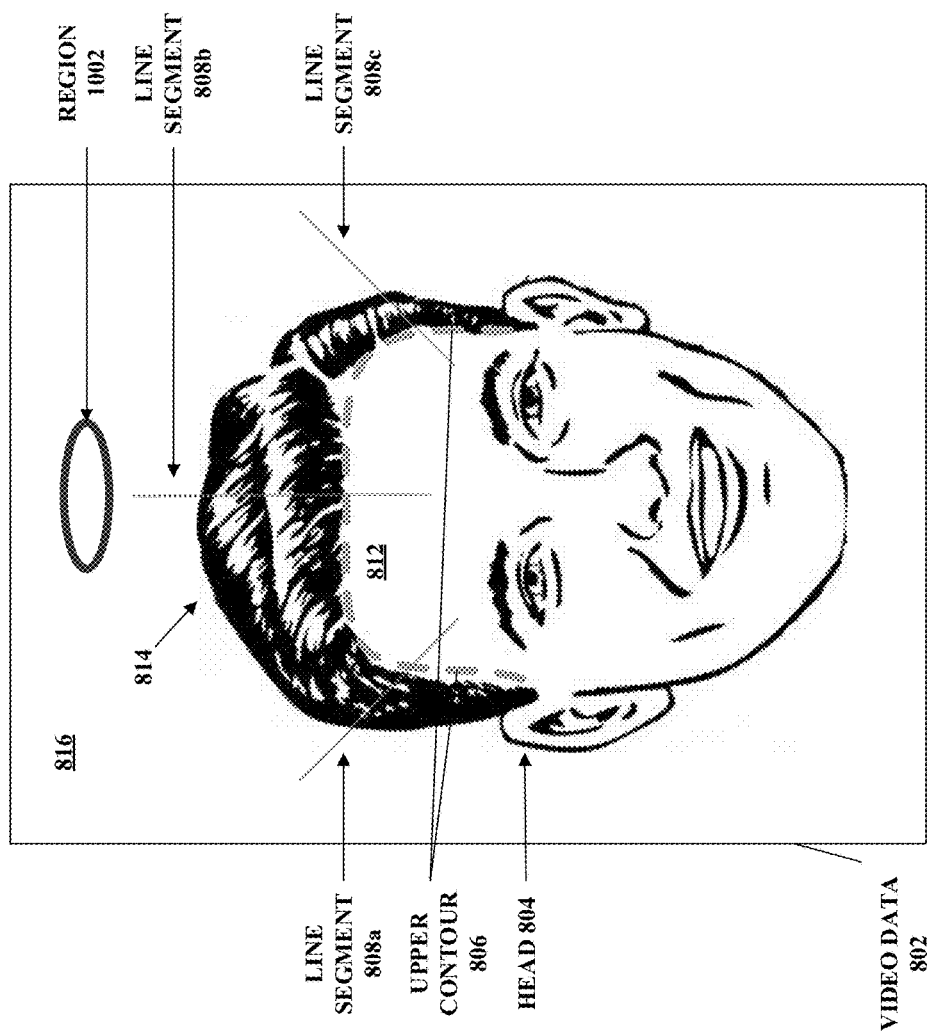
FIG. 10 depicts a second example region used for generating a configuration-independent initial mean color, in accordance with an embodiment.

FIG. 10 depicts a second example region used for generating a configuration-independent initial mean color, in accordance with an embodiment. In particular, FIG. 10 depicts a graphical overview 1000 that includes the video data 802 of FIG. 8. Depicted in the video data 802 is the head 804 of FIG. 8. The upper contour 806 of FIG. 8 and the line segments 808a-c of FIG. 8 are also depicted in the graphical overview 1000. The line segments 808a-c each cross the upper contour 806. The choice of three depicted line segments 808a-c is for the sake of visual simplicity. In many embodiments, there are more than three line segments and in other embodiments there are less than three line segments. The upper contour 806 is depicted as being a dashed line between a forehead 812 and hair 814, however an analogous figure could be constructed with an upper contour depicted as being between the hair 814 and a background 816 of the video data 802.

In at least one embodiment, the process 100b further includes generating, for each line segment 808a-c, a common configuration-independent initial mean color that is representative of the color of the background 816 at least in part by (i) determining a region within the video data 802 that, in its entirety, resides substantially above the upper contour 806 (i.e., a region 1002), and (ii) calculating the configuration-independent initial mean color that is representative of the color of the background 816 to be an average of respective colors of the pixels located within the region 1002.

The region 1002, depicted in the graphical overview 1000, is a first example region that may be used for generating a configuration-independent initial mean color representative of a color of the background 816. The region 1002 is a region that resides, in its entirety, substantially above the upper contour 806 (i.e., a region that resides, in its entirety, within the background 816 of the video data 802). Determining the location of the region 1002 may be accomplished via a variety of means. In one embodiment, face detection is used on the video data 802 to determine a center of the head 804 and the region 1002 is determined to be a region being a certain vertical distance above the determined center of the head 804. In another embodiment, the region 1002 is determined to be a region being a certain vertical distance above the upper contour 806. In another embodiment, the region 1002 is determined by using depth data associated with the video data 802. In particular, in such an embodiment, the region 1002 may be determined to be a region that is far from a depth camera. The previous examples for determining the region 1002 are provided by way of example and are not meant to be limiting in any way. Of course, many other techniques may be used to calculate the region 1002, as such a task is well known by those with skill in the relevant art. The region 1002 is depicted in FIG. 10 as an oval, but may take any suitable shape, as would be known by those with skill in the relevant art. The region 1002 may be used to update a background-color model.

In the graphical overview 1000, the configuration-independent initial mean color that is representative of the background 816 is an average of respective colors of the pixels located within the region 1002. In the graphical overview 1000, the average of respective colors of the pixels located within the region 1002 is used as the configuration-independent initial mean color representative of the color of the background 816 for each of the line segments 808a-c. Because the average of respective colors of the pixels located within the region 1002 is a configuration-independent mean, the average of respective colors of the pixels located within the region 1002 is used for every k-means analysis (i.e., every set of k-means initial conditions or equivalently every k-means initial configuration) that is to be performed on the line segments 808a-c.

Figure 11:
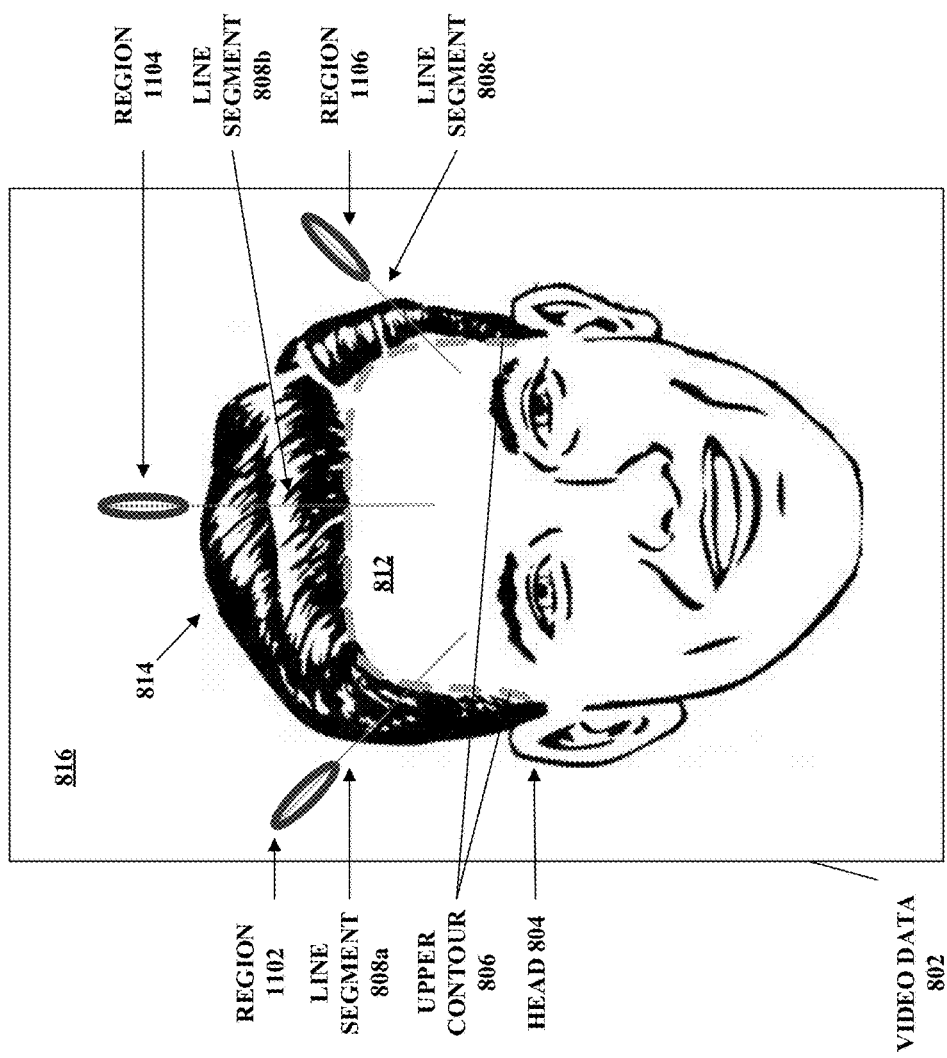
FIG. 11 depicts a second example set of regions used for generating configuration-independent initial mean colors, in accordance with an embodiment.

FIG. 11 depicts a second example set of regions used for generating configuration-independent initial mean colors, in accordance with an embodiment. In particular, FIG. 11 depicts a graphical overview 1100 that includes the video data 802 of FIG. 8. Depicted in the video data 802 is the head 804 of FIG. 8. The upper contour 806 of FIG. 8 and the line segments 808a-c of FIG. 8 are also depicted in the graphical overview 900. The line segments 808a-c each cross the upper contour 806. The choice of three depicted line segments 808a-c is for the sake of visual simplicity. In many embodiments, there are more than three line segments and in other embodiments there are less than three line segments. The upper contour 806 is depicted as being a dashed line between a forehead 812 and hair 814, however an analogous figure could be constructed with an upper contour depicted as being between the hair 814 and a background 816 of the video data 802.

In at least one embodiment, the process 100b further includes generating, for each line segment 808a-c, a respective configuration-independent initial mean color that is representative of a color of the background 816 at least in part by (i) determining a region within the video data 802 that resides at an exterior end of the line segment (i.e., determining a region 1102 for the line segment 808a, a region 1104 for the line segment 808b, and a region 1106 for the line segment 808c), and (ii) calculating the configuration-independent initial mean color that is representative of the color of the background 816 to be an average of respective colors of the pixels located within the region 1102 for the line segment 808a, the region 1104 for the line segment 808b, and the region 1106 for the line segment 808c.

The regions 1102-1106, depicted in the graphical overview 1100, are a first example set of regions that may be used for generating configuration-independent initial mean colors representative of the color of the background 816. The regions 1102-1106 are regions that respectively reside at exterior ends of the line segments 808a-c. The regions 1102-1106 are depicted in FIG. 11 as ovals, but may take any suitable shape, as would be known by those with skill in the relevant art.

In the graphical overview 1100, the region 1102 is used to generate an initial mean color that is representative of the color of the face for the line segment 808a. The region 1104 is used to generate an initial mean color that is representative of the color of the face for the line segment 808b. The region 1106 is used to generate an initial mean color that is representative of the color of the face for the line segment 808c. Because the respective averages of respective colors of the pixels located within the regions 1102-1106 are used as configuration-independent means, the respective averages of respective colors of the pixels located within the regions 1102-1106 is used for every k-means analysis (i.e., every set of k-means initial conditions or equivalently every k-means initial configuration) that is to be performed on the line segments 808*a-c*. The regions 1102-1106 may be used to update a background-color model.

The next portion of this detailed description, regarding FIGS. 12-17, continues to discuss techniques for k-means initial configuration generation. In general, example regions used for generating configuration-dependent means are described. As discussed previously, each line segment in the set of line segments must be initialized with an initial condition (e.g., three means) before undergoing a k-means clustering. In other words, the set of line segments must be initialized with an initial configuration (e.g., three means for each line segment) before undergoing a k-means analysis. It follows that each line segment in the set of line segments must be initialized with three means for each performed k-means analysis. For a given line segment, one of the initial means is varied in each and every k-means analysis. These initial means are configuration-dependent means. For a given k-means analysis, each line segment in the set of line segments may have a single common configuration-dependent initial mean (as in FIGS. 12-14) or may have a respective unique configuration-dependent initial mean (as in FIGS. 15-17).

Figure 12:
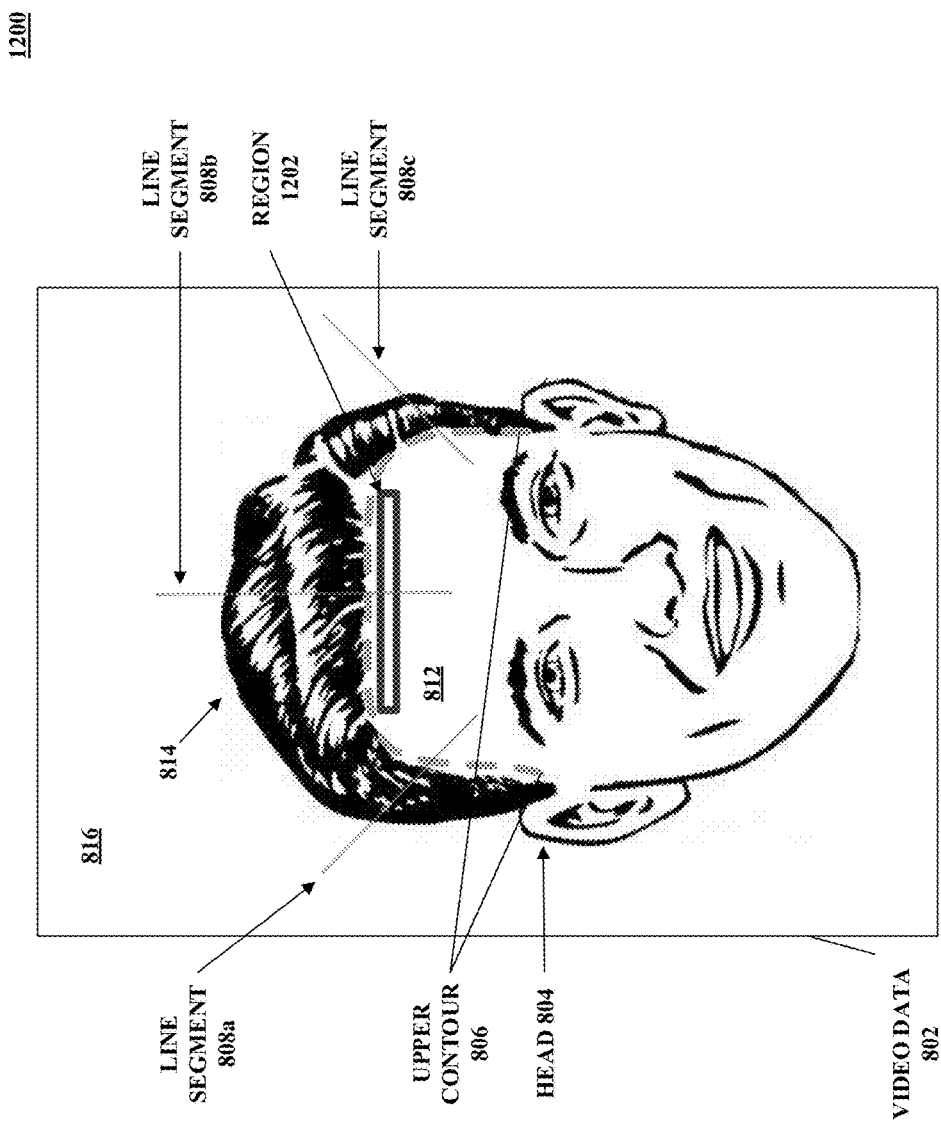
FIG. 12 depicts a first example region used for generating a configuration-dependent initial mean color, in accordance with an embodiment.

FIG. 12 depicts a first example region used for generating a configuration-dependent initial mean color, in accordance with an embodiment. In particular, FIG. 12 depicts a graphical overview 1200 that includes the video data 802 of FIG. 8. Depicted in the video data 802 is the head 804 of FIG. 8. The upper contour 806 of FIG. 8 and the line segments 808*a-c* of FIG. 8 are also depicted in the graphical overview 1200. The line segments 808*a-c* each cross the upper contour 806. The choice of three depicted line segments 808*a-c* is for the sake of visual simplicity. In many embodiments, there are more than three line segments and in other embodiments there are less than three line segments. The upper contour 806 is depicted as being a dashed line between a forehead 812 and hair 814, however an analogous figure could be constructed with an upper contour depicted as being between the hair 814 and a background 816 of the video data 802.

In at least one embodiment, the process 100*b* further includes generating, for each line segment 808*a-c*, a common configuration-dependent initial mean color that is representative of a color of the hair 814 at least in part by (i) determining a region within the video data 802 that, in its entirety, resides immediately below the upper contour 806 (i.e., a region 1202), and (ii) calculating the configuration-independent initial mean color that is representative of the color of the hair 814 to be an average of respective colors of the pixels located within the region 1202.

Figure 13:
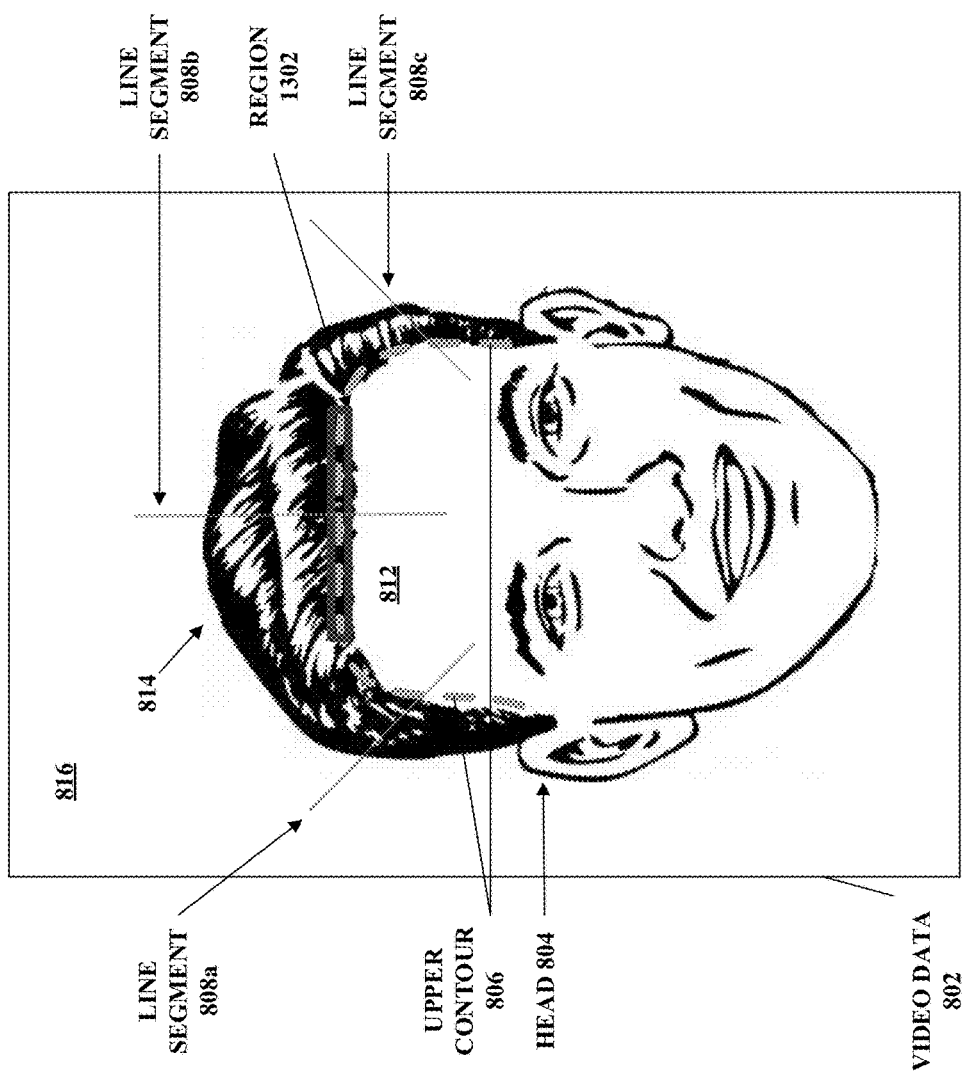
FIG. 13 depicts a second example region used for generating a configuration-dependent initial mean color, in accordance with an embodiment.
Figure 14:
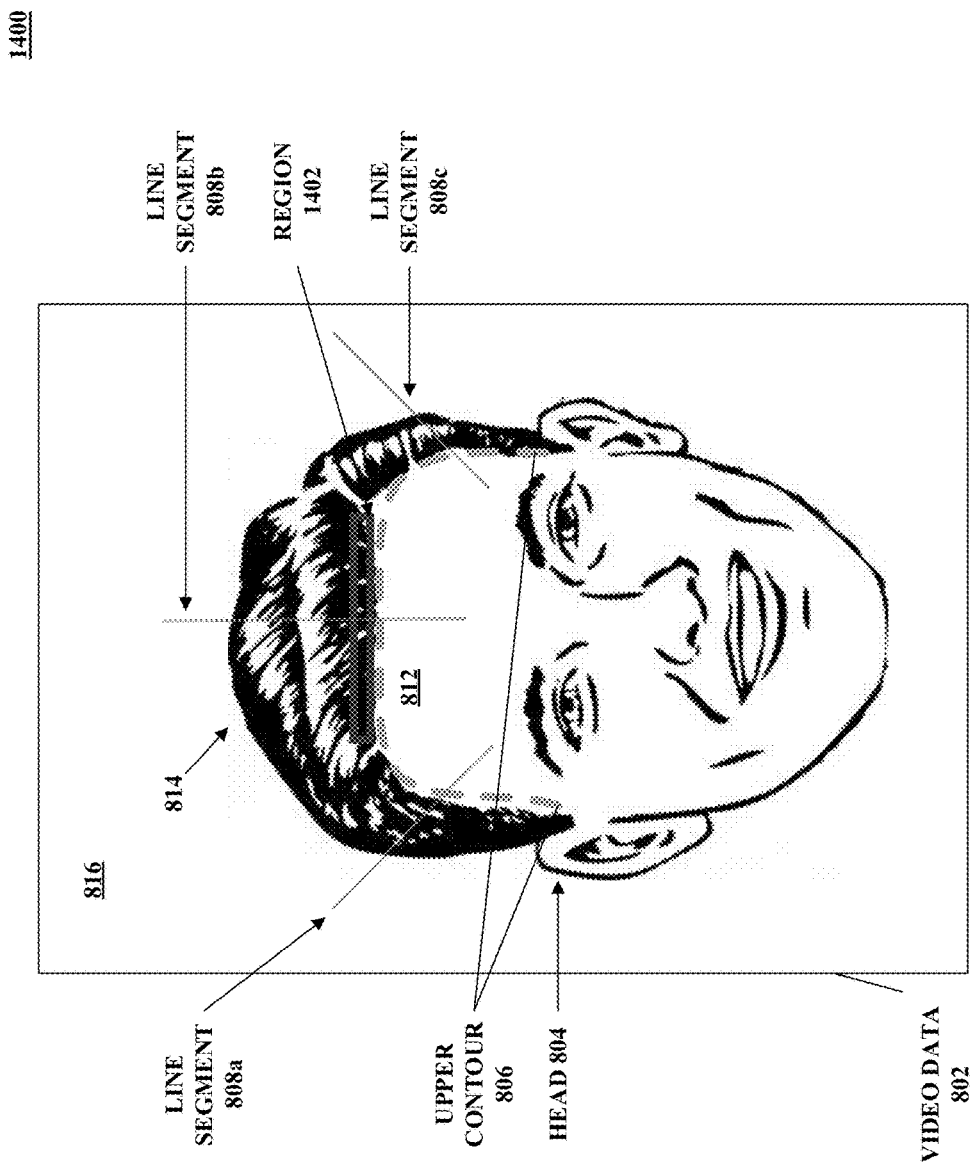
FIG. 14 depicts a third example region used for generating a configuration-dependent initial mean color, in accordance with an embodiment.

The region 1202, depicted in the graphical overview 1200, is a first example region that may be used for generating a configuration-dependent initial mean color representative of the color of the hair 814. The region 1202 is a region that resides, in its entirety, immediately below the upper contour 806. The exact location of the upper contour 806 with respect to the head 804 is unknown, as previously recited in the overview section herein. As a result, it is uncertain whether the region 1202 resides near a hairline of the head 804 (as depicted in FIG. 12) or near a hair-background transition. In FIGS. 12-14 the upper contour 806 is depicted near the hairline of the head 804 and in FIGS. 15-17 an upper contour 1502 is depicted near a hair-background transition. These depictions are provided by way of example and do not indicate a known location of an upper contour with respect to the head 804. The region 1202 is depicted in FIG. 12 as a rectangle, but may take any suitable shape, as would be known by those with skill in the relevant art.

In the graphical overview 1200, the configuration-dependent initial mean color that is representative of the color of the hair 814 is an average of respective colors of the pixels located within the region 1202. In the graphical overview 1200, the average of respective colors of the pixels located within the region 1202 is used as the configuration-dependent initial mean color representative of the color of the hair 814 for each of the line segments 808*a-c*. Because the average of respective colors of the pixels located within the region 1202 is a configuration-dependent mean, the average of respective colors of the pixels located within the region 1202 is used for only one k-means analysis (i.e., a single set of k-means initial conditions or equivalently a single k-means initial configuration) that is to be performed on the line segments 808*a-c*.

FIG. 13 depicts a second example region used for generating a configuration-dependent initial mean color, in accordance with an embodiment. In particular, FIG. 13 depicts a graphical overview 1300 that includes the video data 802 of FIG. 8. Depicted in the video data 802 is the head 804 of FIG. 8. The upper contour 806 of FIG. 8 and the line segments 808*a-c* of FIG. 8 are also depicted in the graphical overview 1300. The line segments 808*a-c* each cross the upper contour 806. The choice of three depicted line segments 808*a-c* is for the sake of visual simplicity. In many embodiments, there are more than three line segments and in other embodiments there are less than three line segments. The upper contour 806 is depicted as being a dashed line between the forehead 812 and hair 814, however an analogous figure could be constructed with an upper contour depicted as being between the hair 814 and a background 816 of the video data 802.

In at least one embodiment, the process 100*b* further includes generating, for each line segment 808*a-c*, a common configuration-dependent initial mean color that is representative of a color of the hair 814 at least in part by (i) determining a region within the video data 802 that is bisected by the upper contour 806 (i.e., a region 1302), and (ii) calculating the configuration-independent initial mean color that is representative of the color of the hair 814 to be an average of respective colors of the pixels located within the region 1302.

The region 1302, depicted in the graphical overview 1300, is a second example region that may be used for generating a configuration-dependent initial mean color representative of the color of the hair 814. The region 1302 is a region that is bisected by the upper contour 806. The exact location of the upper contour 806 with respect to the head 804 is unknown, as previously recited in the overview section herein. As a result, it is uncertain whether the region 1302 resides near a hairline of the head 804 (as depicted in FIG. 13) or near a hair-background transition. The region 1302 is depicted in FIG. 13 as a rectangle, but may take any suitable shape, as would be known by those with skill in the relevant art.

In the graphical overview 1300, the configuration-dependent initial mean color that is representative of the color of the hair 814 is an average of respective colors of the pixels located within the region 1302. In the graphical overview 1300, the average of respective colors of the pixels located within the region 1302 is used as the configuration-dependent initial mean color representative of the color of the hair 814 for each of the line segments 808*a-c*. Because the average of respective colors of the pixels located within the region 1302 is a configuration-dependent mean, the average of respective colors of the pixels located within the region 1302 is used for only one k-means analysis (i.e., a single set of k-means initial conditions or equivalently a single k-means initial configuration) that is to be performed on the line segments 808a-c.

FIG. 14 depicts a third example region used for generating a configuration-dependent initial mean color, in accordance with an embodiment. In particular, FIG. 14 depicts a graphical overview 1400 that includes the video data 802 of FIG. 8. Depicted in the video data 802 is the head 804 of FIG. 8. The upper contour 806 of FIG. 8 and the line segments 808a-c of FIG. 8 are also depicted in the graphical overview 1400. The line segments 808a-c each cross the upper contour 806. The choice of three depicted line segments 808a-c is for the sake of visual simplicity. In many embodiments, there are more than three line segments and in other embodiments there are less than three line segments. The upper contour 806 is depicted as being a dashed line between the forehead 812 and hair 814, however an analogous figure could be constructed with an upper contour depicted as being between the hair 814 and a background 816 of the video data 802.

In at least one embodiment, the process 100b further includes generating, for each line segment 808a-c, a common configuration-dependent initial mean color that is representative of a color of the hair 814 at least in part by (i) determining a region within the video data 802 that, in its entirety, resides immediately above the upper contour 806 (i.e., a region 1402), and (ii) calculating the configuration-independent initial mean color that is representative of the color of the hair 814 to be an average of respective colors of the pixels located within the region 1402.

The region 1402, depicted in the graphical overview 1400, is a third example region that may be used for generating a configuration-dependent initial mean color representative of the color of the hair 814. The region 1402 is a region that, in its entirety, resides immediately above the upper contour 806. The exact location of the upper contour 806 with respect to the head 804 is unknown, as previously recited in the overview section herein. As a result, it is uncertain whether the region 1402 resides near a hairline of the head 804 (as depicted in FIG. 14) or near a hair-background transition. The region 1402 is depicted in FIG. 14 as a rectangle, but may take any suitable shape, as would be known by those with skill in the relevant art.

In the graphical overview 1400, the configuration-dependent initial mean color that is representative of the color of the hair 814 is an average of respective colors of the pixels located within the region 1402. In the graphical overview 1400, the average of respective colors of the pixels located within the region 1402 is used as the configuration-dependent initial mean color representative of the color of the hair 814 for each of the line segments 808a-c. Because the average of respective colors of the pixels located within the region 1402 is a configuration-dependent mean, the average of respective colors of the pixels located within the region 1402 is used for only one k-means analysis (i.e., a single set of k-means initial conditions or equivalently a single k-means initial configuration) that is to be performed on the line segments 808a-c.

Figure 15:
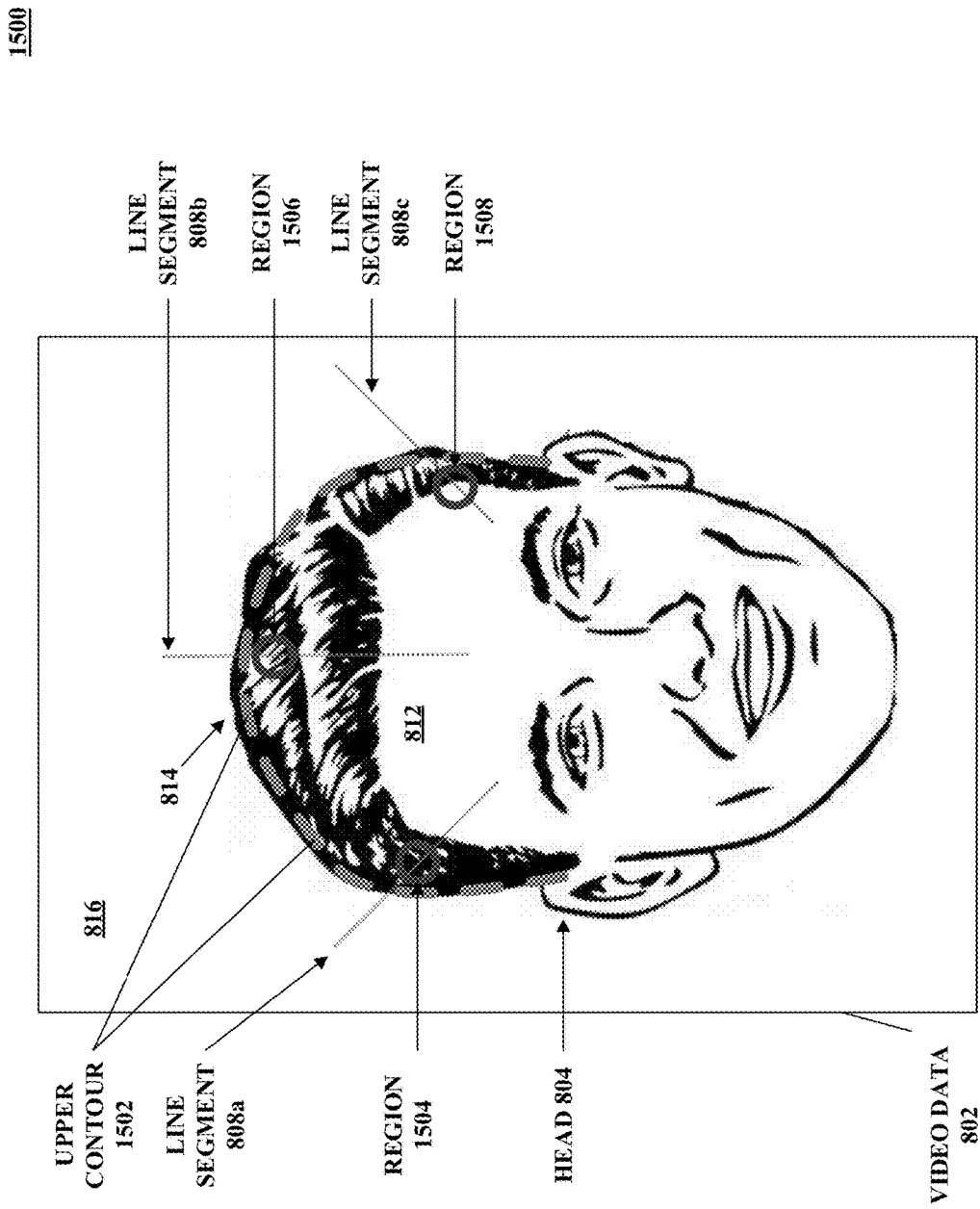
FIG. 15 depicts a first example set of regions used for generating configuration-dependent initial mean colors, in accordance with an embodiment.

FIG. 15 depicts a first example set of regions used for generating configuration-dependent initial mean colors, in accordance with an embodiment. In particular, FIG. 15 depicts a graphical overview 1500 that includes the video data 802 of FIG. 8. Depicted in the video data 802 is the head 804 of FIG. 8. An upper contour 1502 and the line segments 808a-c of FIG. 8 are also depicted in the graphical overview 1500. The line segments 808a-c each cross the upper contour 1502. The choice of three depicted line segments 808a-c is for the sake of visual simplicity. In many embodiments, there are more than three line segments and in other embodiments there are less than three line segments. The upper contour 1502 is depicted as being a dashed line between the hair 814 and a background 816 of the video data 802, however an analogous figure could be constructed with an upper contour depicted as being between the forehead 812 and the hair 814.

In at least one embodiment, the process 100b further includes generating, for each line segment 808a-c, a respective configuration-dependent initial mean color that is representative of a color of the hair 814 at least in part by (i) determining a region within the video data 802 that, in its entirety, resides immediately below the upper contour 1502 (i.e., determining a region 1504 for the line segment 808a, a region 1506 for the line segment 808b, and a region 1508 for the line segment 808c), and (ii) calculating the configuration-dependent initial mean color that is representative of the color of the hair 814 to be an average of respective colors of the pixels located within the region 1504 for the line segment 808a, the region 1506 for the line segment 808b, and the region 1508 for the line segment 808c.

The regions 1504-1508, depicted in the graphical overview 1500, are a first example set of regions that may be used for generating configuration-dependent initial mean colors representative of the color of the hair 814. The regions 1504-1508 are regions that reside, in their entirety, immediately below the upper contour 1502 and are respectively bisected by the line segments 808a-c. The regions 1504-1508 are depicted in FIG. 15 as circles, but may take any suitable shape, as would be known by those with skill in the relevant art.

In the graphical overview 1500, the region 1504 is used to generate an initial mean color that is representative of the color of the hair 814 for the line segment 808a. The region 1506 is used to generate an initial mean color that is representative of the color of the hair 814 for the line segment 808b. The region 1508 is used to generate an initial mean color that is representative of the color of the hair 814 for the line segment 808c. Because the respective averages of respective colors of the pixels located within the regions 1504-1508 are used as configuration-dependent means, the respective averages of respective colors of the pixels located within the regions 1504-1508 are used for a single k-means analysis (i.e., a single set of k-means initial conditions or equivalently a single k-means initial configuration) that is to be performed on the line segments 808a-c.

Figure 16:
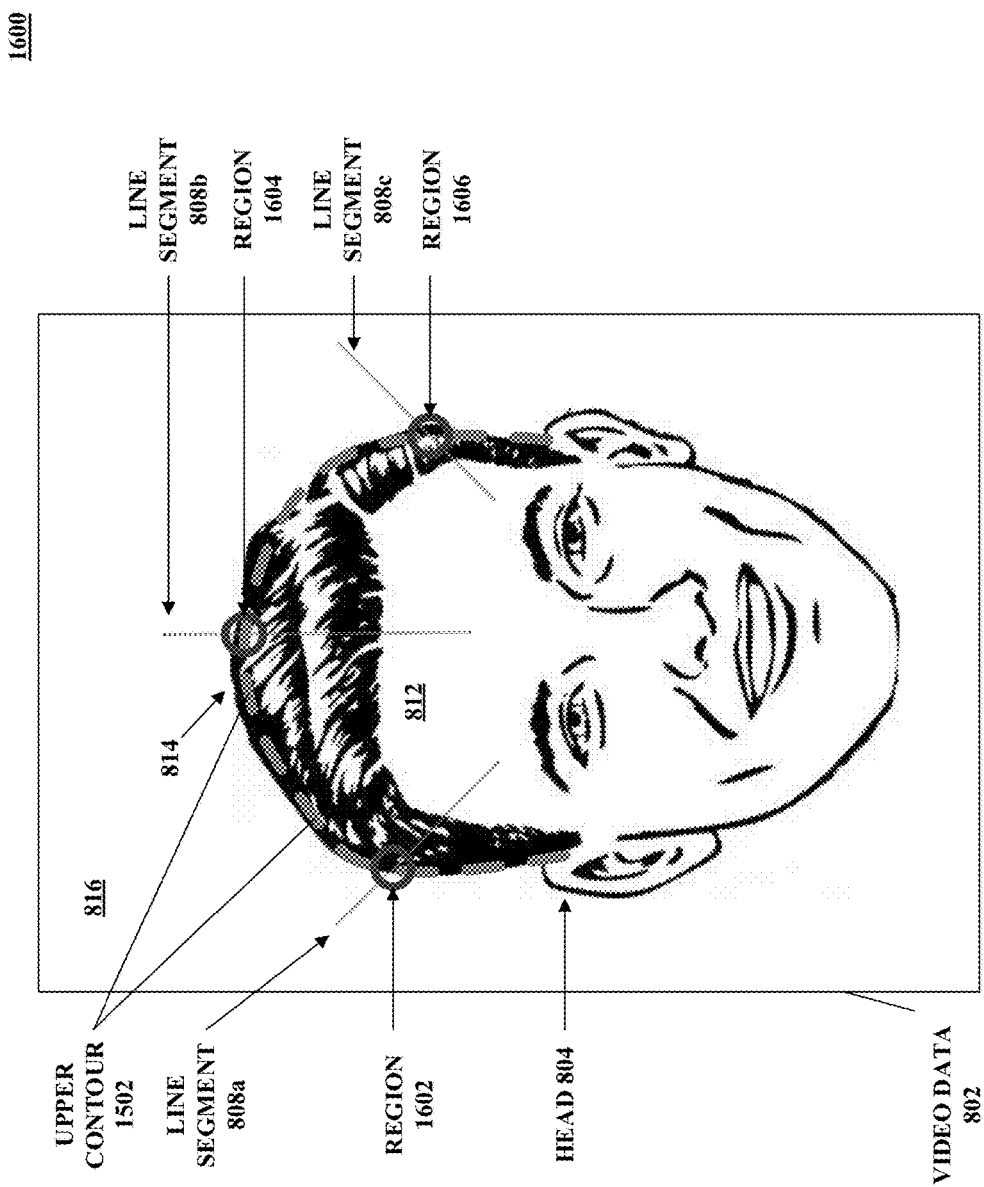
FIG. 16 depicts a second example set of regions used for generating configuration-dependent initial mean colors, in accordance with an embodiment.

FIG. 16 depicts a second example set of regions used for generating configuration-dependent initial mean colors, in accordance with an embodiment. In particular, FIG. 16 depicts a graphical overview 1600 that includes the video data 802 of FIG. 8. Depicted in the video data 802 is the head 804 of FIG. 8. The upper contour 1502 of FIG. 15 and the line segments 808a-c of FIG. 8 are also depicted in the graphical overview 1600. The line segments 808a-c each cross the upper contour 1502. The choice of three depicted line segments 808a-c is for the sake of visual simplicity. In many embodiments, there are more than three line segments and in other embodiments there are less than three line segments. The upper contour 1502 is depicted as being a dashed line between the hair 814 and a background 816 of the video data 802, however an analogous figure could be constructed with an upper contour depicted as being between the forehead 812 and the hair 814.

In at least one embodiment, the process 100b further includes generating, for each line segment 808a-c, a respective configuration-dependent initial mean color that is representative of a color of the hair 814 at least in part by (i) determining a region within the video data 802 that is bisected by the upper contour 1502 (i.e., determining a region 1602 for the line segment 808a, a region 1604 for the line segment 808b, and a region 1606 for the line segment 808c), and (ii) calculating the configuration-dependent initial mean color that is representative of the color of the hair 814 to be an average of respective colors of the pixels located within the region 1602 for the line segment 808a, the region 1604 for the line segment 808b, and the region 1606 for the line segment 808c.

The regions 1602-1606, depicted in the graphical overview 1600, are a second example set of regions that may be used for generating configuration-dependent initial mean colors representative of the color of the hair 814. The regions 1602-1606 are regions that are bisected by the upper contour 1502 and are respectively bisected by the line segments 808a-c. The regions 1602-1606 are depicted in FIG. 16 as circles, but may take any suitable shape, as would be known by those with skill in the relevant art.

In the graphical overview 1600, the region 1602 is used to generate an initial mean color that is representative of the color of the hair 814 for the line segment 808a. The region 1604 is used to generate an initial mean color that is representative of the color of the hair 814 for the line segment 808b. The region 1606 is used to generate an initial mean color that is representative of the color of the hair 814 for the line segment 808c. Because the respective averages of respective colors of the pixels located within the regions 1602-1606 are used as configuration-dependent means, the respective averages of respective colors of the pixels located within the regions 1602-1606 are used for a single k-means analysis (i.e., a single set of k-means initial conditions or equivalently a single k-means initial configuration) that is to be performed on the line segments 808a-c.

Figure 17:
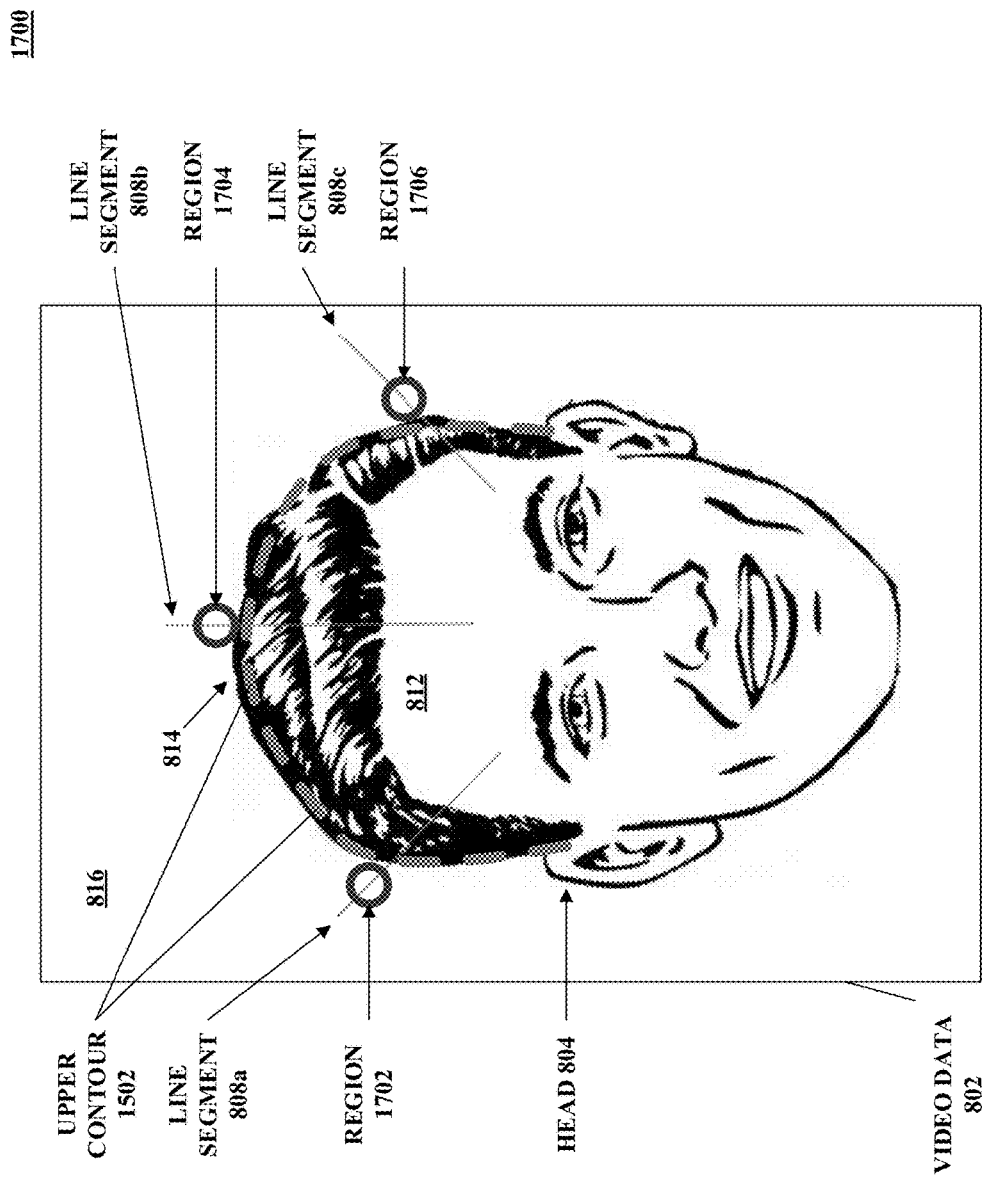
FIG. 17 depicts a third example set of regions used for generating configuration-dependent initial mean colors, in accordance with an embodiment.

FIG. 17 depicts a third example set of regions used for generating configuration-dependent initial mean colors, in accordance with an embodiment. In particular, FIG. 17 depicts a graphical overview 1700 that includes the video data 802 of FIG. 8. Depicted in the video data 802 is the head 804 of FIG. 8. The upper contour 1502 of FIG. 15 and the line segments 808a-c of FIG. 8 are also depicted in the graphical overview 1700. The line segments 808a-c each cross the upper contour 1502. The choice of three depicted line segments 808a-c is for the sake of visual simplicity. In many embodiments, there are more than three line segments and in other embodiments there are less than three line segments. The upper contour 1502 is depicted as being a dashed line between the hair 814 and a background 816 of the video data 802, however an analogous figure could be constructed with an upper contour depicted as being between the forehead 812 and the hair 814.

In at least one embodiment, the process 100b further includes generating, for each line segment 808a-c, a respective configuration-dependent initial mean color that is representative of a color of the hair 814 at least in part by (i) determining a region within the video data 802 that, in its entirety, resides immediately above the upper contour 1502 (i.e., determining a region 1702 for the line segment 808a, a region 1704 for the line segment 808b, and a region 1706 for the line segment 808c), and (ii) calculating the configuration-dependent initial mean color that is representative of the color of the hair 814 to be an average of respective colors of the pixels located within the region 1702 for the line segment 808a, the region 1704 for the line segment 808b, and the region 1706 for the line segment 808c.

The regions 1702-1706, depicted in the graphical overview 1700, are a third example set of regions that may be used for generating configuration-dependent initial mean colors representative of the color of the hair 814. The regions 1702-1706 are regions that are bisected by the upper contour 1502 and are respectively bisected by the line segments 808a-c. The regions 1702-1706 are depicted in FIG. 16 as circles, but may take any suitable shape, as would be known by those with skill in the relevant art.

In the graphical overview 1700, the region 1702 is used to generate an initial mean color that is representative of the color of the hair 814 for the line segment 808a. The region 1704 is used to generate an initial mean color that is representative of the color of the hair 814 for the line segment 808b. The region 1706 is used to generate an initial mean color that is representative of the color of the hair 814 for the line segment 808c. Because the respective averages of respective colors of the pixels located within the regions 1702-1706 are used as configuration-dependent means, the respective averages of respective colors of the pixels located within the regions 1702-1706 are used for a single k-means analysis (i.e., a single set of k-means initial conditions or equivalently a single k-means initial configuration) that is to be performed on the line segments 808a-c.

In embodiments wherein a plurality groupings are performed, such as the k-means example discussed in FIG. 1B and others, the process may include determining which performed grouping produced the most desirable results. Desirable results are determined through use of various performance metrics and discussed below. In some embodiments, hair-sets and hair-pixel clusters and the like which are respectively derived from respective groupings may be used together to update a user-hair-color model (i.e., pixels that are determined to be hair-pixels by different groupings may each be used to update a user-hair-color model).

Figure 18:
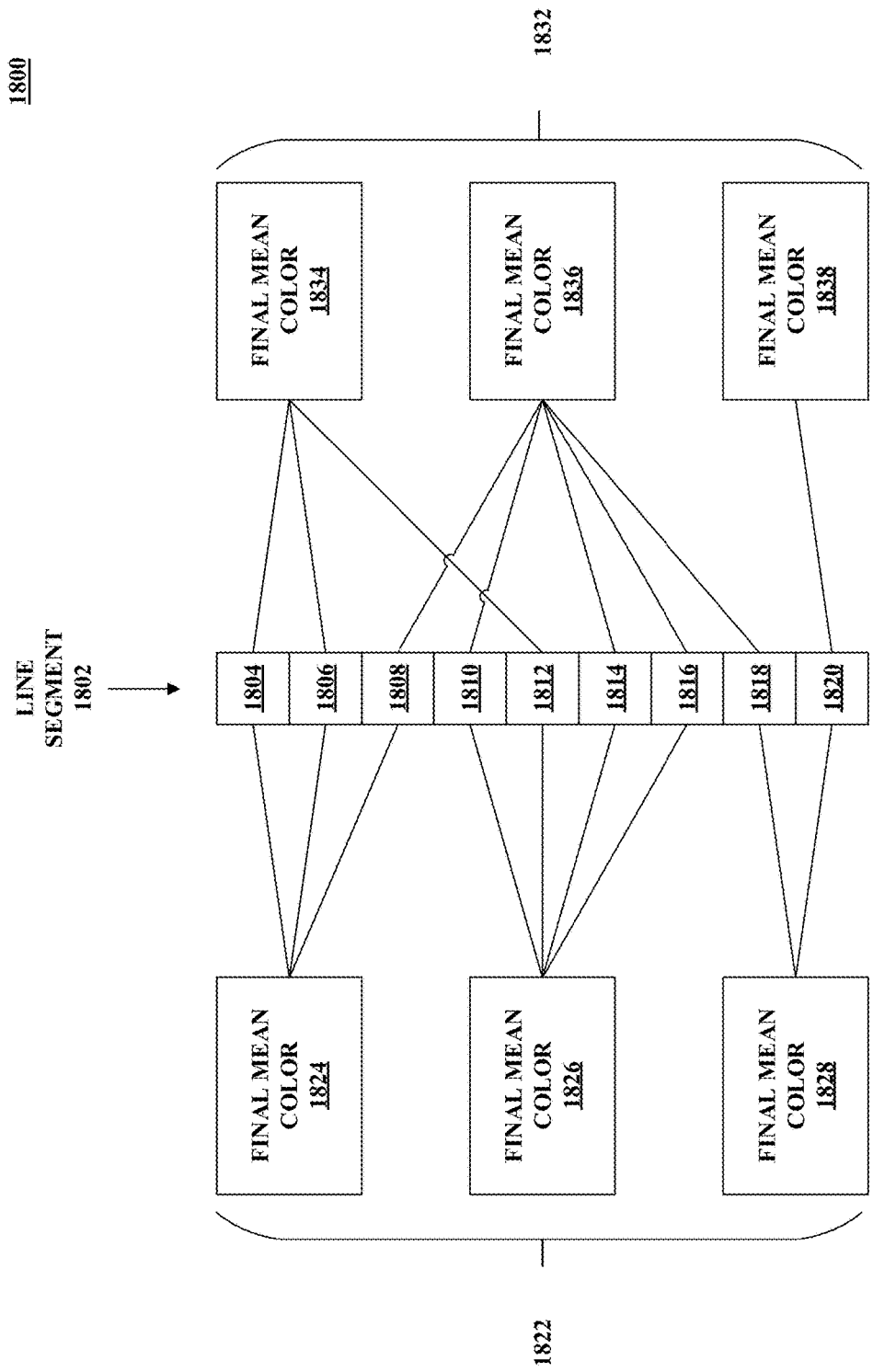
FIG. 18 depicts example results of two k-means analyses, in accordance with an embodiment.

FIG. 18 depicts example results of two k-means analyses, in accordance with an embodiment. In particular, FIG. 18 depicts a graphical overview 1800 that includes a line segment 1802, a first set of final mean colors 1822 resulting from a first k-means analysis, and a second set of final mean colors 1832 resulting from a second k-means analysis. The line segment 1802 includes pixels 1804-1820, each of the pixels 1804-1820 being a respective color. The first set of final mean colors 1822 includes a final mean color 1824, a final mean color 1826, and a final mean color 1828. The final mean color 1824 is derived from a configuration-independent initial mean that is representative of a color of a background. The final mean color 1826 is derived from a configuration-dependent initial mean that is representative of a color of hair of a user. The final mean color 1828 is derived from a configuration-independent initial mean that is representative of a color of a face of the user. The second set of final mean colors 1832 includes a final mean color 1834, a final mean color 1836, and a final mean color 1838. The final mean color 1834 is derived from a configuration-independent initial mean that is representative of a color of a background. The final mean color 1836 is derived from a configuration-dependent initial mean that is representative of a color of hair of a user. The final mean color 1838 is derived from a configuration-independent initial mean that is representative of a color of a face of the user.

The pixels 1804-1820 are broken up into clusters. Each k-means analysis groups the pixels 1804-1820 of the line segment 1802 into three clusters, wherein each cluster corresponds with one of the final mean colors resulting from a k-means clustering of the line segment 1802.

The first k-means analysis produces the final mean color 1824 which is an average color of the respective colors of the pixels 1804-1808. The final mean color 1824 may be used to update a background-color model. The pixels 1804-1808 may be used to update a background-color model. The first k-means analysis also produces the final mean color 1826 which is an average color of the respective colors of the pixels 1810-1816. The first k-means analysis produces the final mean color 1828 which is an average color of the respective colors of the pixels 1818-1820.

The second k-means analysis produces the final mean color 1834 which is an average color of the respective colors of the pixels 1804, 1806, and 1812. The final mean color 1834 may be used to update a background-color model. The pixels 1804, 1806, and 1812 may be used to update a background-color model. The second k-means analysis also produces the final mean color 1836 which is an average color of the respective colors of the pixels 1808. 1810, and 1814-1818. The second k-means analysis produces the final mean color 1838 which is a color of the pixel 1820.

In at least one embodiment, using the final mean colors derived from the configuration-dependent initial mean colors (i.e., the final mean colors 1828 and 1836) to identify the respective set of hair-color pixels from the pixels in the line segment 1802 includes, for each line segment in the set of line segments, (i) selecting each pixel in the line segment that has a color closer to the final mean color that was derived from the configuration-dependent initial mean color (i.e., the final mean colors 1828 and 1836) than to either of the other two final mean colors (i.e, the final mean colors 1824, 1828, 1834, and 1838), and (ii) identifying the respective set of hair-color pixels as the selected pixels.

In at least one such embodiment, selecting one of the identified sets of hair-color pixels (e.g., selecting either the pixels in the cluster associated with the final mean 1826 or selecting the pixels associated with the final mean 1836) based on one or more hair-color-pixel-set criteria includes selecting whichever identified set of hair-color pixels is larger. In FIG. 18 the identified set of hair pixels associated with the final mean color 1836 is larger as it includes five pixels and the identified set of hair pixels associated with the final mean 1826 only includes four pixels.

The graphic overview 1800 is a simple example, as the set of line segments includes only one line segment, the line segment 1802. In an embodiment with a plural number of line segments in the set of line segments, each line segment in the set of line segments will be associated with its own sets of final mean colors (one set of final mean colors per line segment per k-means analysis).

In typical embodiments, with a plural number of line segments, selecting one of the identified sets of hair-color pixels based on one or more hair-color-pixel-set criteria includes performing a segment-by-segment analysis.

In at least one such embodiment, for each line segment in the set of line segments, the results of various k-means analyses are compared. For each line segment in the set of line segments, a number of continuous pixels, each having a color that is closer to the final mean color associated with the configuration-dependent initial mean color than to either of the other two final mean colors, is compared between each of the various k-means analyses. On a line-segment-by-line-segment basis, a preferred k-means analysis is determined to be whichever k-means analysis employed the initial configuration that produced the largest number of continuous pixels. The preferred k-means analysis is determined for each line segment, A respective tally/count of line segments that all prefer a given k-means analysis is maintained (i.e., each k-means analysis has a corresponding tally/count of line segments that preferred that k-means analysis).

In some embodiments, selecting one of the identified sets of hair-color pixels based on one or more hair-color-pixel-set criteria includes selecting whichever identified set of hair-color pixels is associated with the k-means analysis that produced the largest tally/count.

Additionally, selecting hair-color pixels may include selecting a subset of pixels from the selected identified set. At least one embodiment comprises selecting only pixels from line segments that prefer the k-means analysis which produced the largest tally/count. In at least one embodiment, using the final mean colors (i.e., the final mean colors 1828 and 1836) derived from the configuration-dependent initial mean colors to identify the respective set of hair-color pixels from the pixels in the line segment 1802 includes, for each line segment in the set of line segments, (i) selecting a longest continuous group of pixels in the line segment. wherein each pixel in the group has a color that is closer to the final mean color (i.e., the final mean colors 1826 and 1836) that was derived from the configuration-dependent initial mean color than to either of the other two final mean colors (i.e, the final mean colors 1824, 1828, 1834, and 1838), and (ii) identifying the respective set of hair-color pixels as the pixels in the longest continuous groups (i.e., the pixels 1810-1816 for the first k-means analysis and the pixels 1814-1818 for the second k-means analysis).

Furthermore, the preferred analysis may be determined as follows. In at least one embodiment, for each line segment in the set of line segments, a number of continuous pixels, each having a color that is closer to the final mean color associated with the configuration-dependent initial mean color than to either of the other two final mean colors, is compared against a threshold length. Each line segment, wherein the number of continuous pixels having a color that is closer to the final mean color associated with the configuration-dependent initial mean color than to either of the other two final mean colors is greater in length than the threshold length, is counted as valid. A respective tally/count of valid line segments for each k-means analysis is maintained (i.e., each k-means analysis has a corresponding tally/count of valid line segments). The preferred k-means analysis is the analysis which produced the largest count of valid line segments. Many other techniques for determining line segment validity may be employed as well, many of which are discussed herein.

In some embodiments, selecting one of the identified sets of hair-color pixels based on one or more hair-color-pixel-set criteria includes selecting whichever identified set of hair-color pixels is associated with the k-means analysis that produced the largest tally/count of valid line segments.

In at least one embodiment, selecting one of the identified sets of hair-color pixels (e.g., selecting either the pixels in the longest continuous group associated with the final mean 1826 or selecting the pixels in the longest continuous group associated with the final mean 1836) based on one or more hair-color-pixel-set criteria includes selecting whichever identified set of hair-color pixels is larger. In FIG. 18 the identified set of hair pixels associated with the final mean color 1826 is larger as it includes four pixels and the identified set of hair pixels associated with the final mean 1836 only includes three pixels.

In at least one embodiment, using the final mean colors (i.e., the final mean colors 1828 and 1836) derived from the configuration-dependent initial mean colors to identify the respective set of hair-color pixels from the pixels in the line segment 1802 includes, for each line segment in the set of line segments, (i) selecting a longest continuous group of pixels in the line segment. wherein each pixel in the group has a color that is closer to the final mean color (i.e., the final mean colors 1826 and 1836) that was derived from the configuration-dependent initial mean color than to either of the other two final mean colors (i.e, the final mean colors 1824, 1828, 1834, and 1838), (ii) selecting the longest continuous groups that exceed a threshold length, and (iii) identifying the respective set of hair-color pixels as the pixels in the selected longest continuous groups. As an example, if the threshold length is two then the respective set of hair-color pixels is the pixels 1810-1816 for the first k-means analysis and the pixels 1814-1818 for the second k-means analysis, however if the threshold length is three then the respective set of hair-color pixels is the pixels 1810-1816 for the first k-means analysis and no pixels for the second k-means analysis.

In at least one such embodiment, selecting one of the identified sets of hair-color pixels based on one or more hair-color-pixel-set criteria includes selecting whichever identified set of hair-color pixels is larger. In at least one other such embodiment, selecting one of the identified sets of hair-color pixels based on one or more hair-color-pixel-set criteria includes selecting whichever identified set of hair-color pixels includes more selected longest continuous groups.

In at least one embodiment, an individual hair-color pixel or set of hair-color pixels is disregarded because it is not within a threshold tolerance of being hair according to an existing user-hair-color model. In at least one embodiment, an individual hair-color pixel or set of hair-color pixels is disregarded because it is within a threshold tolerance of being background according to an existing background-color model.

Figure 19:
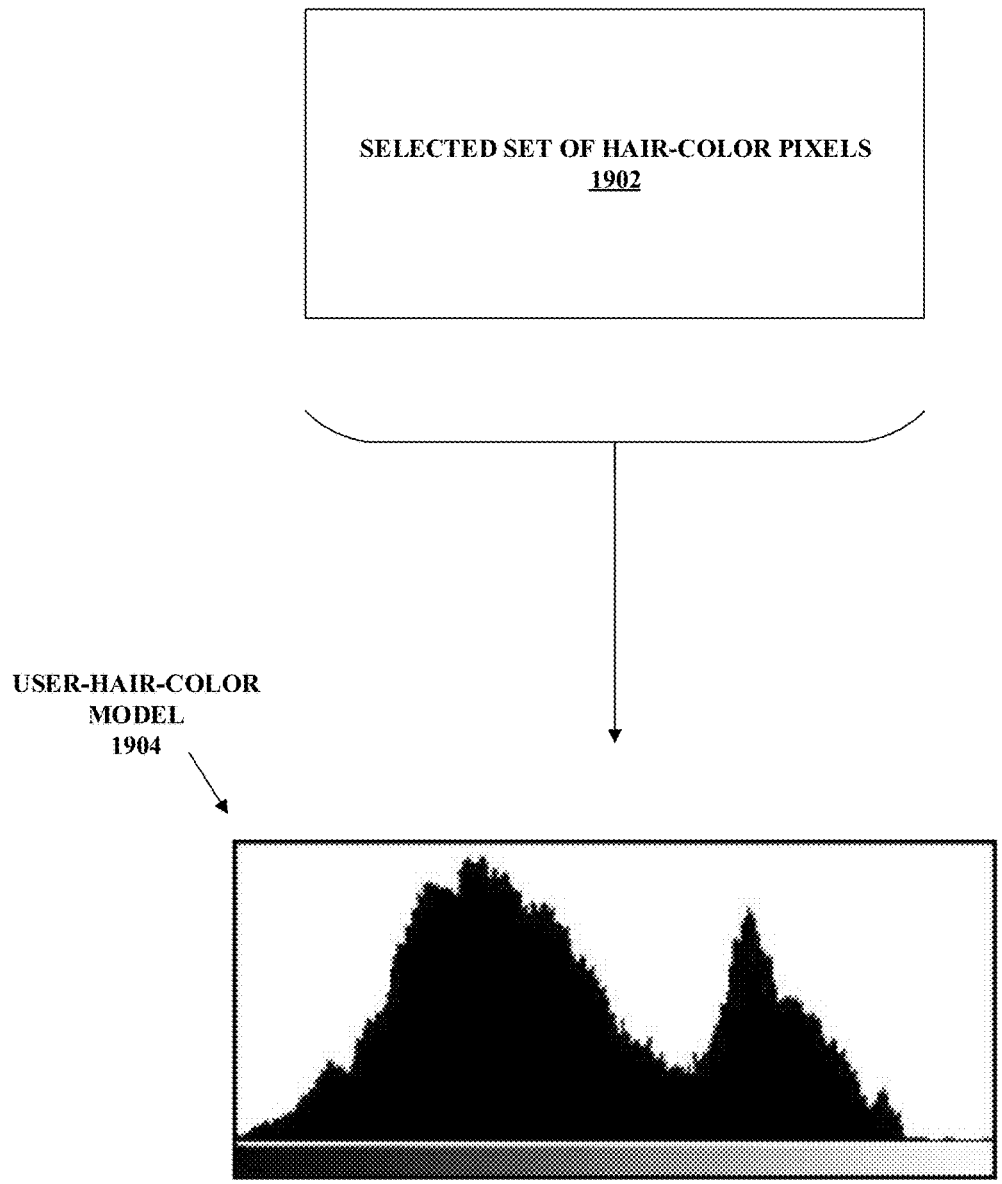
FIG. 19 depicts a generation of a user-hair-color model, in accordance with an embodiment.

FIG. 19 depicts a generation of a user-hair-color model, in accordance with an embodiment. In particular, FIG. 19 depicts a graphical overview 1900 that includes a selected set of hair-color pixels 1902 and a user-hair-color model 1904. In at least one embodiment, using the selected set of hair-color pixels 1902 to generate the user-hair-color model 1904 includes, for each pixel in the selected set of hair-color pixels 1902, adding a singular user-hair-color-model entry corresponding to a color of the pixel. In at least one other embodiment, using the selected set of hair-color pixels 1902 to generate the user-hair-color model 1904 includes, for each pixel in the selected set of hair-color pixels 1902, adding a plurality of user-hair-color-model entries corresponding to a color of the pixel as well as colors that are close to the color of the pixel. This technique is known as padding and is well understood by those with skill in the relevant art.

Figure 20:
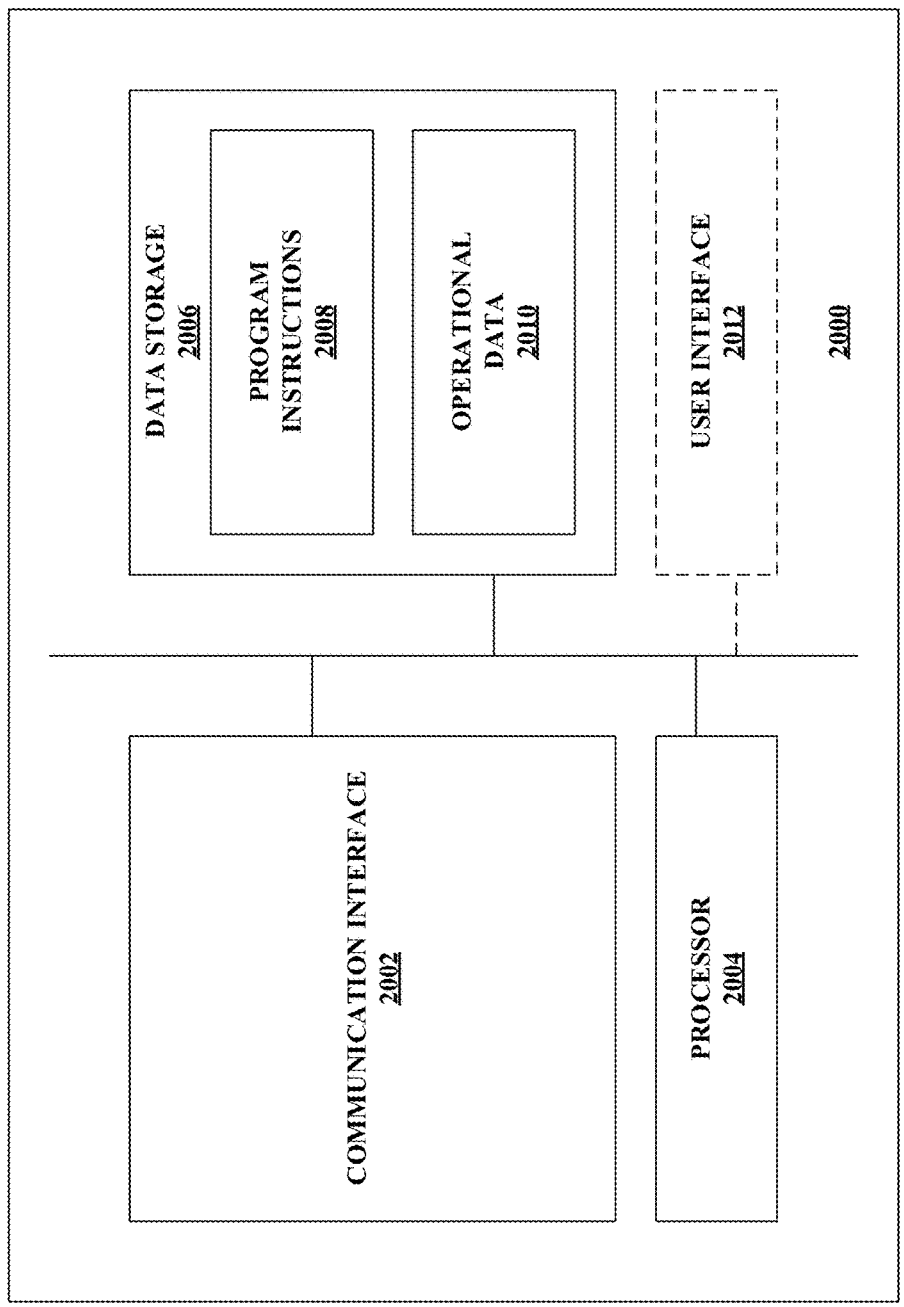
FIG. 20 depicts an example computing and communication device (CCD), in accordance with an embodiment.

FIG. 20 depicts an example computing and communication device (CCD), in accordance with an embodiment. In the embodiment that is depicted in FIG. 20, an example CCD 2000 includes a communication interface 2002, a processor 2004, and data storage 2006 containing instructions 2008 executable by the processor 2004 for causing the CCD 2000 to carry out a set of functions, which may include those functions described above in connection with FIG. 1A and/or FIG. 1B. As a general matter, the example CCD 2000 is presented as an example system that could be programmed and configured to carry out the functions described herein.

The communication interface 2002 may include one or more wireless-communication interfaces (for communicating according to, e.g., APCO P25, TETRA, DMR, LTE, Wi-Fi, NFC, Bluetooth, and/or one or more other wireless-communication protocols) and/or one or more wired-communication interfaces (for communicating according to, e.g., Ethernet, USB, eSATA, IEEE 1394, and/or one or more other wired-communication protocols). As such, the communication interface 2002 may include any necessary hardware (e.g., chipsets, antennas, Ethernet cards, etc.), any necessary firmware, and any necessary software for conducting one or more forms of communication with one or more other entities as described herein. The processor 2004 may include one or more processors of any type deemed suitable by those of skill in the relevant art, some examples including a general-purpose microprocessor and a dedicated digital signal processor (DSP).

The data storage 2006 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 20, the data storage 2006 contains program instructions 2008 executable by the processor 2004 for carrying out various functions, and also contains operational data 2010, which could include any one or more types of data stored and/or accessed by the example CCD 2000 during operation. In embodiments in which a computing system such as the example CCD 2000 is arranged, programmed, and configured to carry out processes such as the example process that is described above in connection with FIG. 1A and or FIG. 1B, the program instructions 2008 are executable by the processor 2004 for carrying out those functions; in instances where other entities described herein have a structure similar to that of the example CCD 2000, the respective program instructions 2008 for those respective devices are executable by their respective processors 2004 to carry out functions respectively performed by those devices.

If present, the user interface 2012 may include one or more input devices (a.k.a. components and the like) and/or one or more output devices (a.k.a. components and the like). With respect to input devices, the user interface 2012 may include one or more touchscreens, buttons, switches, microphones, and the like. With respect to output devices, the user interface 2012 may include one or more displays, speakers, light emitting diodes (LEDs), and the like. Moreover, one or more components (e.g., an interactive touchscreen-and-display component) of the user interface 2012 could provide both user-input and user-output functionality. And certainly other user-interface components could be used in a given context, as known to those of skill in the art. Furthermore, the CCD 2000 may include one or more video cameras, depth cameras, 3-D cameras, infrared-visible cameras, light-field cameras or a combination thereof.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 1%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   obtaining video data depicting a head of a user;
   determining a set of line segments of pixels of the video data, wherein each line segment in the determined set of line segments intersects an upper contour of the depicted head of the user;
   grouping at least some of the pixels of at least one of the line segments in the determined set of line segments into three sets of pixels based at least in part on respective color data of the pixels, wherein the three sets of pixels include a skin-pixel set, a hair-pixel set, and a background-pixel set; and
   updating a user hair-color model based at least in part on the hair-pixel set.

2. The method of claim 1, further comprising generating the upper contour of the depicted head of the user.

3. The method of claim 2, wherein generating the upper contour of the depicted head of the user comprises:
   obtaining depth data that is associated with the video data;
   identifying a region of the video data that corresponds with depth values that are within a threshold depth range; and
   identifying an upper boundary of the identified region as being the upper contour of the depicted head of the user.

4. The method of claim 2, wherein generating the upper contour of the depicted head of the user comprises:
   obtaining a head contour that estimates an outline of the depicted head of the user; and
   identifying an upper boundary of the obtained head contour as being the upper contour of the depicted head of the user.

5. The method of claim 1, wherein determining the set of line segments of pixels of the video data comprises:
   identifying a center of the depicted head of the user;
   identifying at least one line segment of pixels of the video data that originates from the identified center of the depicted head of the user and intersects the upper contour; and
   determining the identified at least one line segment of pixels of the video data to be in the set of line segments.

6. The method of claim 1, wherein the grouping assigns each of the pixels to one and only one of the three sets of pixels.

7. The method of claim 1, wherein the grouping assigns at least one of the pixels to more than one of the three sets of pixels.

8. The method of claim 1, wherein grouping the pixels comprises employing a k-means clustering algorithm to group the pixels.

9. The method of claim 1, wherein grouping the pixels comprises employing a Viterbi algorithm to group the pixels.

10. The method of claim 1, wherein grouping the pixels comprises employing a support vector machine algorithm to group the pixels.

11. The method of claim 1, wherein grouping the pixels comprises employing an expectation maximization algorithm to group the pixels.

12. The method of claim 1, wherein:
grouping the pixels comprises performing multiple independent groupings of at least some of the pixels of at least one of the line segments in the determined set of line segments;
each performed grouping respectively outputs three sets of pixels based at least in part on respective color data of the pixels;
each respective three sets of pixels includes a respective skin-pixel set, a respective hair-pixel set, and a respective background-pixel set;
the method further comprises selecting one of the respective hair-pixel sets based on one or more hair-pixel-set quality metrics; and
updating the user hair-color model based at least in part on the hair-pixel set comprises updating the user hair-color model based at least in part on the selected hair-pixel set.

13. The method of claim 12, wherein each independent grouping of at least some of the pixels of at least one of the line segments in the determined set of line segments employs a different type of grouping algorithm.

14. The method of claim 12, wherein each independent grouping of at least some of the pixels of at least one of the line segments in the determined set of line segments employs a same type of grouping algorithm and a different set of grouping algorithm parameters.

15. The method of claim 1, further comprising updating a background-color model based at least in part on the background-pixel set.

16. The method of claim 1, wherein the user hair-color model is at least one of a histogram, a machine learning classifier, a Gaussian mixture, and an array of color values with respective color counts.

17. The method of claim 1, wherein updating the user hair-color model based at least in part on the hair-pixel set comprises, for each pixel in the hair-pixel set:
adding a plurality of user-hair-color-model entries to the user hair-color model, the entries corresponding to a color of the pixel as well as colors that are within a threshold tolerance of the color of the pixel.

18. A system comprising:
a communication interface;
a processor; and
non-transitory computer-readable data storage containing instructions executable by the processor for causing the system to carry out a set of functions, the set of functions including:
obtaining video data depicting a head of a user;
determining a set of line segments of pixels of the video data, wherein each line segment in the determined set of line segments intersects an upper contour of the depicted head of the user;
grouping at least some of the pixels of at least one of the line segments in the determined set of line segments into three sets of pixels based at least in part on respective color data of the pixels, wherein the three sets of pixels include a skin-pixel set, a hair-pixel set, and a background-pixel set; and
updating a user hair-color model based at least in part on the hair-pixel set.

19. A method comprising:
obtaining video data depicting a head of a user;
obtaining an upper contour of the head of the user;
determining a set of line segments of pixels, each line segment in the set of line segments crossing the upper contour;
selecting a first number of k-means initial configurations, each selected k-means initial configuration including, for each line segment in the set of line segments, two initial mean colors that are configuration-independent and one initial mean color that is configuration-dependent;
performing the first number of independent k-means analyses on the set of line segments, each independent k-means analysis (i) using a different one of the selected k-means initial configurations and (ii) identifying, for each line segment in the set of line segments, three final mean colors respectively derived from the three initial mean colors;
for each of the performed k-means analyses, using the final mean colors derived from the configuration-dependent initial mean colors to identify a respective set of hair-color pixels from the pixels in the line segments;
selecting one of the identified sets of hair-color pixels based on one or more hair-color-pixel-set criteria; and
using the selected set of hair-color pixels to generate a user-hair-color model of the head of the user.

20. The method of claim 19, wherein one of the two configuration-independent initial mean colors is representative of a color of a face of the user, the other of the two configuration-independent initial mean colors is representative of a color of background of the video data, and the configuration-dependent initial mean color is representative of a color of hair of the user.

* * * * *